United States Patent
Bhatt et al.

(10) Patent No.: US 11,138,668 B2
(45) Date of Patent: Oct. 5, 2021

(54) DATA PROCESSING SYSTEM FOR IMPLEMENTING FINANCIAL ASSET TRANSACTIONS IN A RETAIL ENVIRONMENT

(75) Inventors: Manish Bhatt, Hampton, NJ (US); Raymond Burton, Plainsboro, NJ (US); Leslie Hyman, Westport, CT (US)

(73) Assignee: METROPOLITAN LIFE INSURANCE CO., New York, NY (US)

( * ) Notice: Subject to any disclaimer, the term of this patent is extended or adjusted under 35 U.S.C. 154(b) by 0 days.

(21) Appl. No.: 13/608,854

(22) Filed: Sep. 10, 2012

(65) Prior Publication Data
US 2014/0074513 A1    Mar. 13, 2014

(51) Int. Cl.
*G06Q 40/00*    (2012.01)
*G06Q 40/08*    (2012.01)
*G06Q 20/12*    (2012.01)

(52) U.S. Cl.
CPC ............ *G06Q 40/08* (2013.01); *G06Q 20/12* (2013.01)

(58) Field of Classification Search
USPC .... 705/4, 39, 26, 40, 41, 45, 80, 50, 51, 57; 235/379, 380
See application file for complete search history.

(56) References Cited

U.S. PATENT DOCUMENTS

| 8,286,863 B1 | 10/2012 | Brooks |
| 2001/0044733 A1 | 11/2001 | Lee et al. |
| 2002/0010599 A1* | 1/2002 | Levison ............................ 705/4 |
| 2006/0116903 A1 | 6/2006 | Becerra |
| 2006/0138215 A1 | 6/2006 | Pallares |
| 2007/0011033 A1* | 1/2007 | Atkinson ............... G06Q 10/10 705/4 |
| 2007/0067735 A1* | 3/2007 | Hawley ................ G06Q 10/087 715/792 |
| 2008/0095441 A1 | 4/2008 | Rosskamm et al. |
| 2009/0055226 A1* | 2/2009 | Tritz .................. G06Q 30/0283 705/4 |
| 2009/0157434 A1* | 6/2009 | Darr ....................... G06Q 40/06 705/4 |
| 2009/0157437 A1 | 6/2009 | Becerra et al. |
| 2009/0287511 A1* | 11/2009 | Carroll et al. ..................... 705/4 |
| 2010/0078476 A1* | 4/2010 | Ben-Zvi ............... G06Q 20/349 235/380 |
| 2010/0299162 A1* | 11/2010 | Kwan ............................... 705/4 |
| 2011/0161117 A1* | 6/2011 | Busque ............. G06Q 20/3278 705/4 |

(Continued)

OTHER PUBLICATIONS

A Survey of Payment Card Industry Data Security Standard; IEEE Communications Surveys & Tutorials (vol. 12, Issue: 3, pp. 287-303); Jing Liu, Yang Xiao, Hui Chen; Suat Ozdemir, Srinivas Dodie , Vikas Singh; Jul. 1, 2010. (Year: 2010).*

(Continued)

*Primary Examiner* — Tien C Nguyen
(74) *Attorney, Agent, or Firm* — Eric R. Garcia, Esq.; Polsinelli PC

(57) ABSTRACT

A data processing implemented sales and activation system is used to distribute insurance products and services. A two stage operation is facilitated by the selectively arranged retail packaging used in conjunction with an on-line activation process to permit enhanced marketing of insurance and other insured products and services.

3 Claims, 38 Drawing Sheets

(56) References Cited

U.S. PATENT DOCUMENTS

| | | | |
|---|---|---|---|
| 2011/0264594 A1 | 10/2011 | Govindaraju | |
| 2011/0320224 A1 | 12/2011 | Sen et al. | |
| 2012/0078783 A1* | 3/2012 | Park | G06Q 20/32 |
| | | | 705/41 |
| 2013/0166324 A1* | 6/2013 | Lally | 705/4 |
| 2013/0191170 A1 | 7/2013 | Jarrett et al. | |
| 2013/0290034 A1* | 10/2013 | Czaja | G06Q 10/10 |
| | | | 705/4 |

OTHER PUBLICATIONS

The Customized Store; Niche Envy: Marketing Discrimination in the Digital Age; Joseph Turow; Jan. 1, 2008. (Year: 2008).*

Sturdevant, "At Costco, Members Can Now Buy Aetna Health Insurance" [online] published Apr. 24, 2012 Retrieved from the Internet <URL:http://articles.courant.com/2012-04-24/news/hc-costco-aetna-20120424_1_costco-employees-aetna-health-insurance-health-coverage>pg. 1.

White, "Would You Buy Health Insurance at Costco?" [online] published Apr. 26, 2012. [retrieved on Feb. 7, 2014] Retrieved from the Internet<URL:http://business.time.com/2012/04/26would-you-buy-health-insurance-at-costco/> pg. 1.

Bell, Allison. Costco to sell Aetna Individual Health Insurance. Apr. 24, 2012. http://www.lifehealthpro.com/2012/04/24/costco-to-sell-aetna-individual-health-insurance.

Dahl, Corey, Walmart Just Moved Your Cheese, Nov. 12, 2012. http://www.lifehealthpro.com/2012/11/12.walmart-just-moved-your-cheese.

Dahl, Corey, Toilet Paper, lightbulbs, . . . and Life Insurance? Jul. 5, 2012. http://www.lifehealthpro.com/2012/07/05/toilet-paper-lightbulbs-and-life-insurance.

Smith, Mark. Stock Up on Life Insurance at Walmart. Oct. 10, 2012. http://www.insurance.com/life-insurance/carriers/metlife-walmart.html.

* cited by examiner

100

Day 1 System Diagram

Building the Journey: Mapping the Customer Path

FIGURE 5 Activation Hub Wireframe

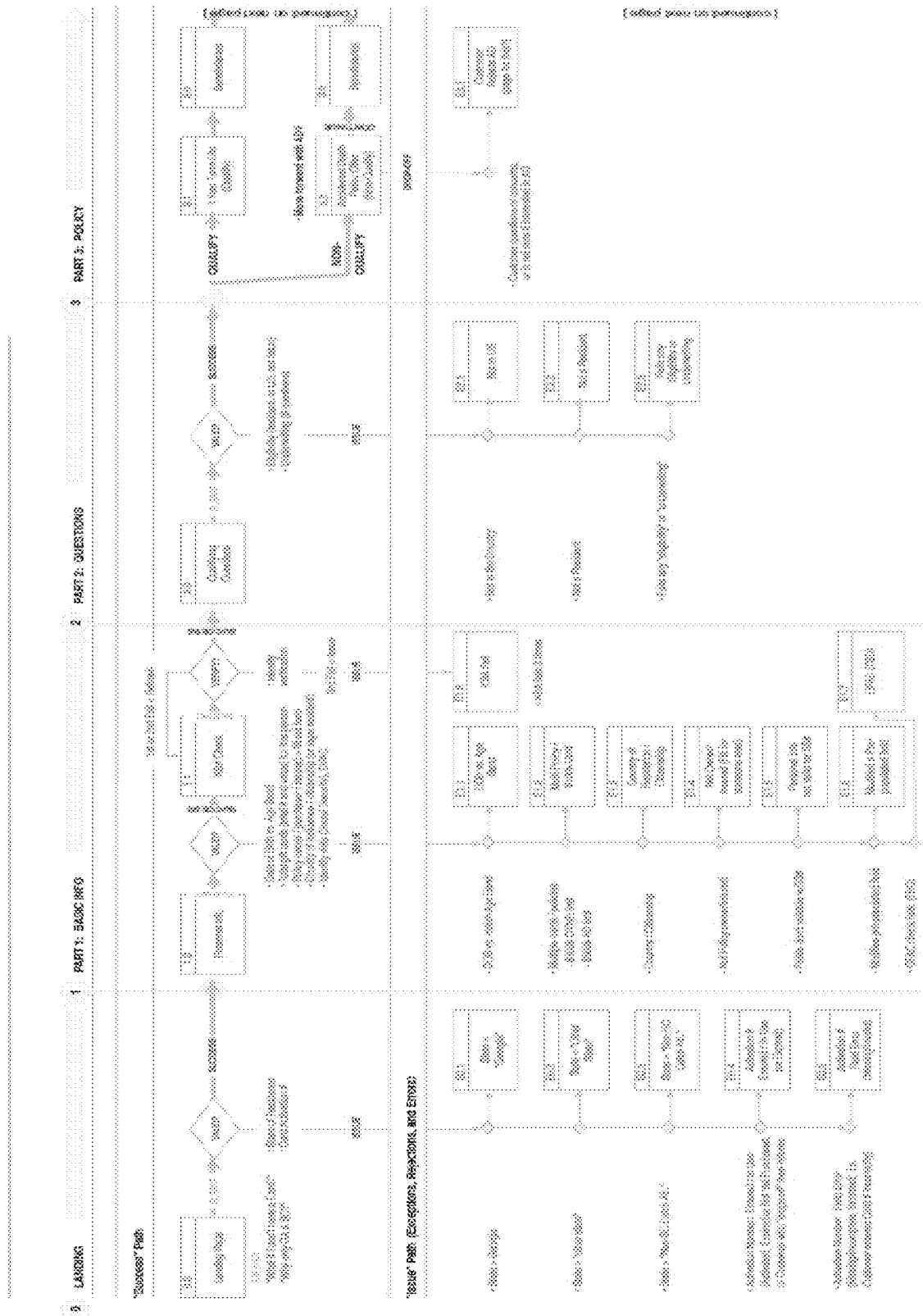

DATA PROCESSING SYSTEM FOR IMPLEMENTING FINANCIAL ASSET TRANSACTIONS IN A RETAIL ENVIRONMENT

The present invention is directed to a data processing system for implementing an enhanced retail purchase of select financial assets. In particular, the present invention provides a data management process to facilitate the purchase of sophisticated financial products in a retail environment.

BACKGROUND

While the retail shopping experience has found expression in a wide range of distinct forms, there are many attributes common to this style of shopping. "Big box" stores such as Costco™ and Sam's Club™ offer large, wide aisles with heavily discounted but limited selections. Department stores such as Lord & Taylor™ present sophisticated islands with warm and posh fixtures, while Walmart™ and Target™ promote super low prices in comfortably large and selectively styled stores. Notwithstanding these distinct forms, browsing through merchandise in each instance is very similar—and familiar to millions.

In each instance, a browsing experience permits individualized and unmolested shopping through check-out, with assistance only if needed. It is, by far, the most commonly enjoyed shopping experience throughout most Western economies and is widely used to distribute nearly all forms of products and services. Its advantages, while well known, have not been successfully adapted for use in selling insurance products or services, or other similar financial instruments.

For example, past efforts to sell insurance products at retail outlets have been largely unsuccessful. Purchasing insurance is a complex process that often involves a dialogue with the buyer, collection of information to assist in pricing the policy, and often, intrusive private inquiries and medical examinations. In addition to the time requirement and intrusive questions, the choice of insurance is often a private matter and one that nearly always requires a trusted individual to assist in the process. In many ways, the process of purchasing insurance is the antithesis of the vastly more enjoyable retail shopping experience discussed above.

Much of these additional characteristics of financial product purchases stem from the product attributes. For example, insurance providers base their premiums on actuarial science and calculations that weigh the likelihood of the insured event occurring against a variety of factors, including the number of similarly insured individuals, i.e., the size and risk of the pool. It has been difficult to competitively price policies that are both profitable for the insurer and desirable for the insured on an individual basis without an investigation into the insured's various risk factors. In many instances, a questionnaire is provided to the insured to determine this level of risk and to appropriately price a policy. Often times, several different agents of the insurer will contact the potential insured or be involved in the approval and pricing of a policy for the potential insured. Additionally, the time from application to coverage may take upwards of six to eight weeks. This process is frequently perceived by the insured as a particularly burdensome and unfavorable experience and often leads to potential insurance customers opting to not purchase insurance products in order to avoid these drawbacks.

Finally, the benefits of insurance are far more subtle than most retail purchases. Insurance products provide peace-of-mind for a perceived risk, but in most human experiences such comfort is hard to measure, particularly in comparison to most impulse purchases. For example, the purchase of an LCD flat screen television is linked to immediate pleasurable relaxation; a $500,000 term life insurance policy—less so.

Of course insurance is still a critical aspect of any family financial picture and a must-have item. Accordingly, there remains a need for a system and method of procuring risk-based insurance policies which is convenient, private, quick, and comforting. Many individuals continue to risk being uninsured due to the undue hassles, inaccessibility, and apparent unaffordability of insurance products to the middle-class and lower-class markets.

Illustrative Inventive Concepts

It is an aspect of the patent invention to provide a computer implemented system to support retail-based financial products distribution.

It is another aspect of the present invention to provide a data processing method for tracking and coordinating insurance acquisition based on retail purchases of insurance products.

It is yet another aspect of the present invention to provide a computer system that selectively authorizes the purchase of discrete insurance products previously funded through the retail sale of pre-paid cards.

In still another aspect of the present invention, an insurance product package comprises a credit storage device such as a pre-paid card or similar, one or more insurance purchase process instructions, one or more disclosure documents, and pre-printed forms to implement an insurance purchase all contained in a single retail package.

The foregoing features of the present invention are realized in a financial instrument purchase system that involves a two-stage operation. For the first stage, a retail/banking outlet distributes and sells a packaged financial product of select characteristics and corresponding to a specific discrete asset value, but not active, at the time of purchase. At retail, the package is simply added to the shopping cart and purchased at checkout. The package includes instructions, processing forms and an activation device, such as a pre-paid card, with select/unique codes to permit computer-assisted activation of the financial instrument.

In accordance with the varying aspects of the present invention, the packaged retail product is directed to financial products and services such as term life insurance, auto and home insurance, individual retirement account investment, mutual fund asset purchase and/or select equity and debt instruments for various financial purposes, including education, retirement and health care planning.

In addition to the retail purchase, the second stage involves a computer implemented activation process where select account information is collected, risk profiles addressed, regulatory requirements tracked and confirmed, and the underlying product purchase is fulfilled, confirmed and documented.

BRIEF DESCRIPTION OF THE DRAWINGS

FIGS. 5-31 are screen displays for operation of the insurance "stage two" process steps;

FIGS. 32A-B is a flow diagram and architecture of the activation process provided in the screen display;

FIGS. 33A-B provides the overview of the on-line processes;

FIGS. 34A-B provides the data fields for the on-line processes; and

DETAILED DESCRIPTION

To better understand the features and attributes of the present invention, the following written description is provided of an illustrative embodiment, discussed in conjunction with the referenced figures.

Turning now to the illustrative arrangement depicted in the Figures, a packaged financial product for retail sale and supporting system are described. In particular, a store such as Walmart™ or Target™ will include a product display promoting packaged financial product (or "retail product") that includes everything needed to purchase a term life insurance product with a one year fixed premium policy—all in one box. A suitably sized box with attractive graphics and informative text is displayed and a stack of similar boxes is positioned for easy review and selection. A purchase of the package is recorded at check-out and the customer can initiate the activation process through an agent with the retail product at home over the telephone or on his/her computer via internet connection. In one embodiment, a threshold level of insurance attaches after the initial purchase; in a second embodiment, no insurance is active until an activation session is completed by the purchaser.

Figure 1:
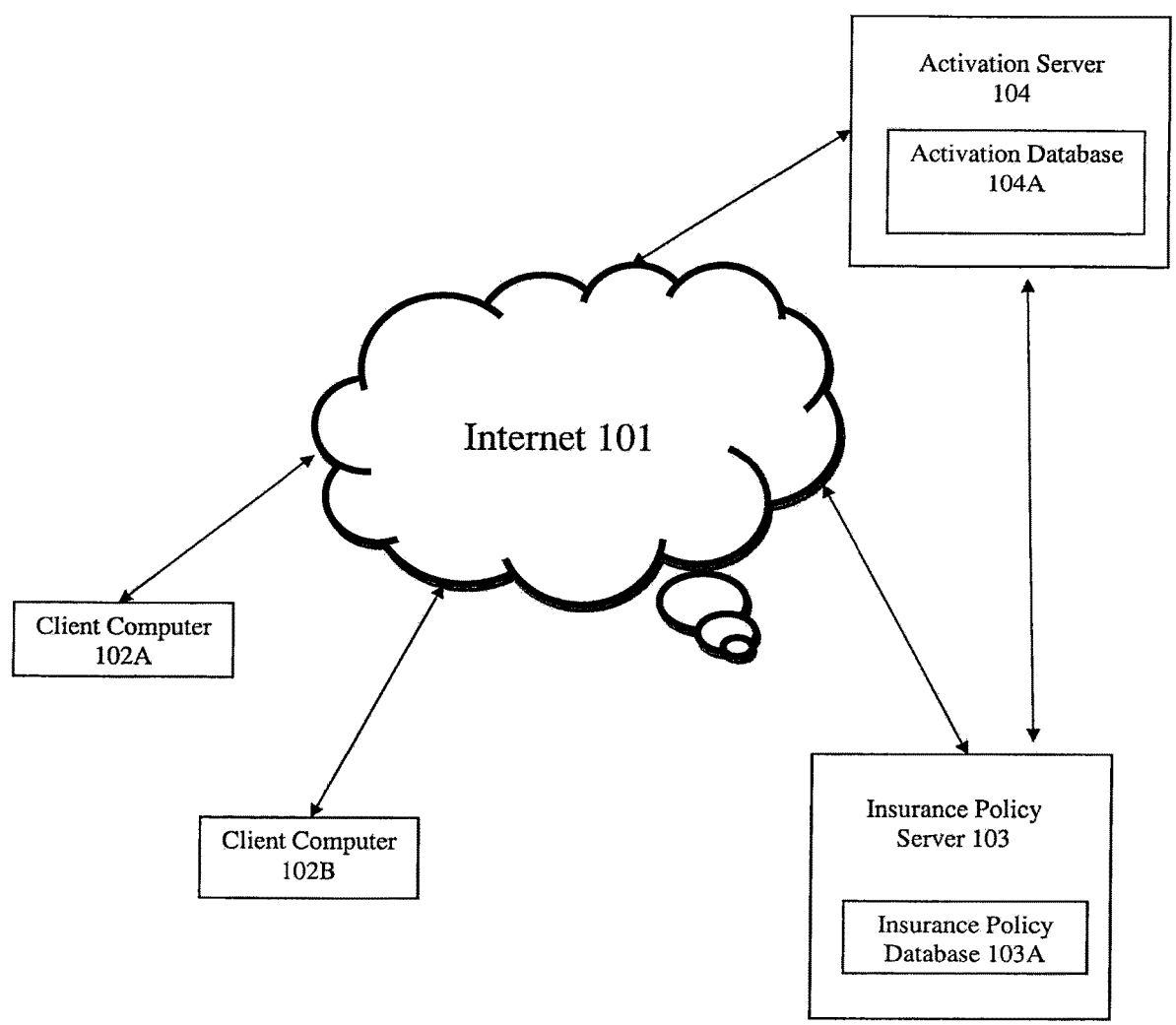
FIG. 1 depicts a functional relationship diagram for the operating working environment.

FIG. 1 illustrates an embodiment of the system of the present disclosure for in-store insurance policy purchases. System 100 includes Client Computer 102A and Client Computer 102B, each containing client software (not shown) for accessing a remote system, such as a web browser accessing a webpage, such as Activation Server 104 via Internet 101. Client Computer 102A is one of many multiple client devices, only two of which are illustrated for purposes of simplicity of explanation, useable by Customer.

The retail financial product may consist of physical media purchased at a retail outlet as more fully described below. The product may use an electronic code, data, or communication, such as a text message or information displayed on a smartphone application. The retail financial product may be redeemed for an insurance policy by communication with Activation Server 104 by Customer through Client Computer 102A. Activation Server 104 contains an Activation Database 103A which includes information about each retail financial product, however and wherever purchased, such that Customer may redeem the retail financial product by inputting, scanning, or otherwise transmitting an identification code or data to Activation Server 104. Upon receipt of the identification code or data at Activation Server 104, the identification code or data is compared with data in Activation Database 104A to determine the value or policy associated with the retail financial product.

Activation Server 104 will then confirm policy or value associated with the retail financial product for Customer. Upon confirmation, Activation Server 104 may activate, as more fully described in FIG. 2, an insurance policy for Customer and transmit such insurance policy information to Insurance Policy Server 103 for storage into Insurance Policy Database 103A. The Insurance Policy Server 103 may be used to administer the insurance policy purchased by Customer.

Figure 2:
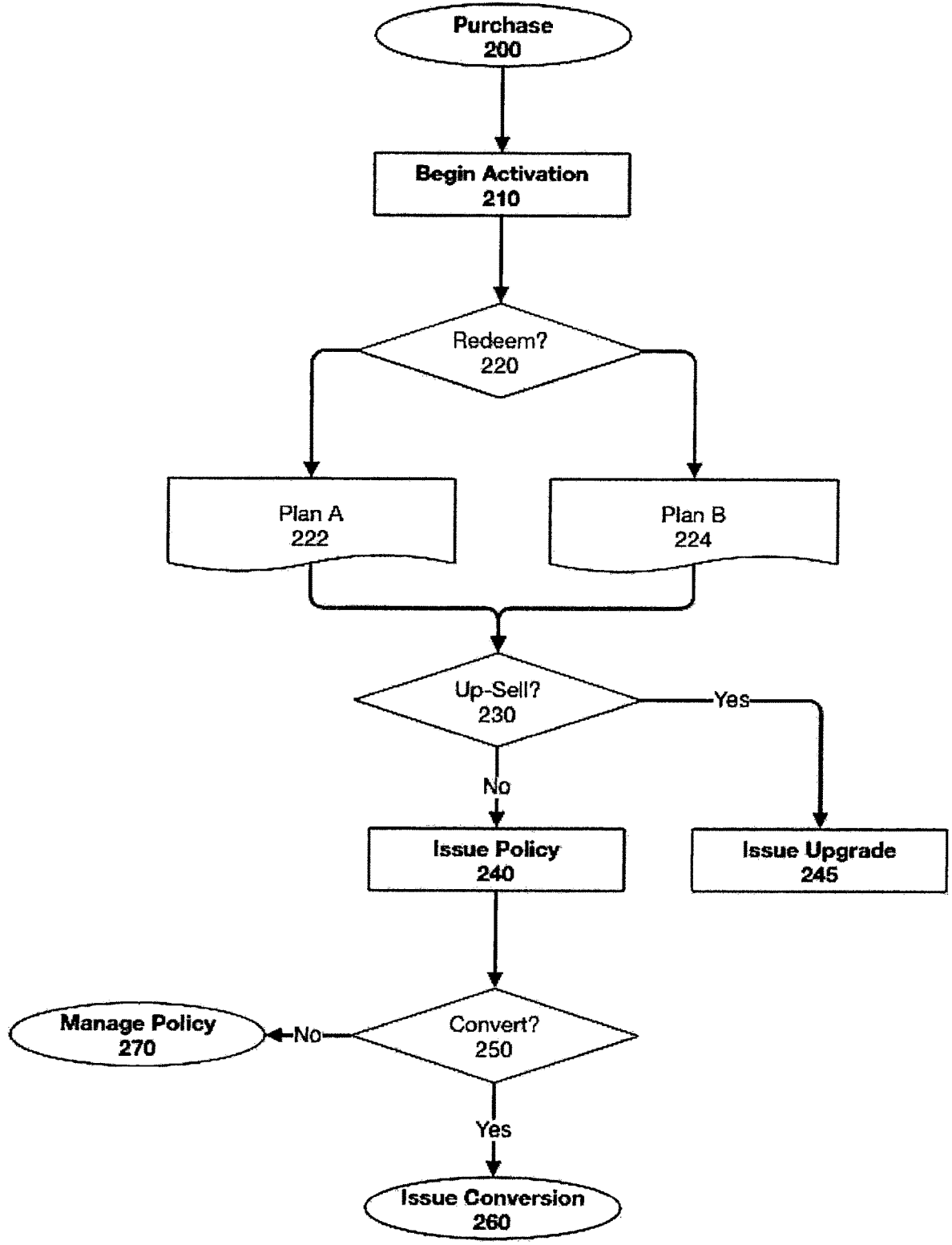
FIG. 2 provides a generalized flow chart of the overall activation process for insurance.

FIG. 2 describes the process flow in one embodiment of the invention. The process starts at step 200 where the Customer purchases the retail financial product from retail or other form of establishment. The process continues to step 210 where the Customer begins activation of the retail financial product by contacting an activation service. Customer then enters a redemption code or otherwise causes a redemption event at step 220 and is given an option or questionnaire in order to determine which policy will be redeemed by Customer. In some aspects of the invention, Customer may answer a questionnaire in order to determine for which insurance products or plans the Customer is eligible; for example, Plan A 222 or Plan B 224. In other aspects and embodiments, Customer may be presented with the option to select from multiple plans such as Plan A 222 and Plan B 224, which may be valued at the same or similar costs but may have different objectives, terms, or conditions. While this exemplary FIG. 2 depicts only two plans for redemption, those of skill in the art will appreciate that any number of plans may be available at the redemption process depending on various aspects and variables related to Customer, Policy Plan, etc.

Upon selection of the appropriate plan by Customer, Customer will advance to step 230 wherein Customer is optionally presented with an opportunity to increase her level of insurance beyond the level previously purchased in the retail financial product. This opportunity may come electronically or by the activation and alert of a call center which may cause a manual communication to take place. The up-sell opportunity may be provided at a reduced cost than traditionally offered at this stage as may be appreciated by those of ordinary skill in the art. The up-sell opportunity may also provide access to traditional insurance policies beyond Plan A 222 or Plan B 224. If Customer selects to upgrade her policy, she will be issued an upgraded policy at step 245. If Customer does not select to upgrade her policy, she will be issued her pre-purchased or pre-selected policy at step 240.

During the life of the issued policy, or upon termination of the issued policy, Customer may be prompted with the opportunity to convert or migrate her policy into a traditional, new term, or longer-term insurance policy at step 250. According to other embodiments of the invention, Customer may have the opportunity to self-convert or migrate her policy at any time through the use of a computer, such as through a website, through a telephone, through the mail, or through any other form of communication as will be appreciated by those of skill in the art. If Customer elects to convert or migrate her policy, she will be issued a converted policy at terminating step 260. If she elects not to convert or migrate her policy, she proceeds to step 270 wherein her original policy is managed to term.

The invention described above is operational with general purpose or special purpose computing system environments or configurations. Examples of well known computing systems, environments, and/or configurations that may be suitable for use with the invention include, but are not limited to: personal computers, server computers, hand-held or laptop devices, tablet devices, smartphones, multiprocessor systems, microprocessor-based systems, set top boxes, programmable consumer electronics, household and commercial appliances, vehicles and other networked transportation systems, network PCs, minicomputers, mainframe computers, distributed computing environments that include any of the above systems or devices, and the like.

Components of the inventive computer system may include, but are not limited to, an input device or devices, an output device or display, a processing unit, a system memory, and a system bus that couples various system components including the system memory, processing unit, and input and output devices. The system bus may be any of several types of bus structures including a memory bus or memory controller, a peripheral bus, and a local bus using any of a variety of bus architectures.

The computer system typically includes a connection or access to a variety of non-transitory computer-readable media. Computer-readable media can be any available media that can be accessed by the computer and includes both volatile and nonvolatile media, and removable and non-removable media. By way of example, and not limitation, computer-readable media may comprise computer storage media and communication media. Computer storage media may store information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, networked or "cloud" storage, or any other medium which can be used to store the desired information and which can accessed by the computer. Communication media typically embodies computer-readable instructions, data structures, program modules or other data in a modulated data signal and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The computer system may operate in a networked environment using logical connections to one or more remote computers. The remote computer may be a personal computer, a server, a router, a network PC, hand-held or laptop devices, tablet devices, smartphones, multiprocessor systems, microprocessor-based systems, set top boxes, programmable consumer electronics, household and commercial appliances, vehicles and other networked transportation systems, a peer device or other common network node, and typically includes many or all of the elements described above relative to the computer. The logical connections depicted in include one or more local area networks (LAN) and one or more wide area networks (WAN), but may also include other networks such as cellular and digital wireless networks. Such networking environments are commonplace in offices, enterprise-wide computer networks, intranets, and the Internet.

After the in-store purchase, the activation process can proceed along two potential paths on-line. First, for a simple life insurance product for a narrow group of applicants, the system permits a direct, on-line application where the applicant, assisted by a system supplied "eConsultant" (embodied intelligence for insurance questions). Second, for many other types of products, a second conversion is provided, when the applicant speaks directly to a real agent, and the agent prepares the electronic application.

For the first, unassisted process, six steps are provided via browser based internet communication link (as discussed in FIG. 2). The steps are:

TABLE I

| 1 | Learn about the Life Insurance eConsultant |
| 2 | Needs assessment |
| 3 | Provide coverage recommendations (confirm eUnderwriting eligibility) |
| 4 | Complete the on-line application |
| 5 | Provide payment |
| 6 | Confirm consent/Electronic signature |

The second, agent-assisted process is described and discussed in FIGS. 5-35. This second procedure offers many advantages but is of course more labor intensive.

Non-Insurance Applications

The above discussion has focused on insurance products, and in particular using a term life product as an illustration. The system can support direct retail sale of other financial products with characteristics that parallel those regarding insurance. In the insurance field, auto and home policies may be pre-packaged with terms for new cars, luxury cars, compact cars, or similar divisions. In home insurance, tiering can be done by location, house size, household size, house type or house value.

Outside of insurance, various investment options may be offered using the system provided herein. For example, retirement investments for 401(k) or IRA's can be pre-packaged at monetary increments, or investment type (mutual funds for equity, fixed income, inflation protection and others). Home equity loans and refinancing, home improvements and similar lending products can be pre-packaged to support subsequent "activation" in accordance with system parameters depicted herein. In the field of health care, pre-paid packages may include routine physicals, dental cleanings or health insurance alone or coupled to one or more health treatments.

Pre-Paid Card

One component of the retail package is the pre-paid card. Similar to a debit or phone card, the Insurance Card can be set to a particular value (e.g., $50, $100 or $500 cards) or adjustable based on packaging or code as assigned. In a preferred embodiment, and to comply with regulatory requirements, this card will be used as a prepaid funding device for purchasing insurance. To comply with regulatory and disclosure requirements, activation can be contingent on one or more check operations necessary for use of the card. This process can be modified so that the card becomes the same as cash if the purchaser declines to use it for insurance—and authorized for use in any purchase universally, or at select retail/on-line stores. In one embodiment, the card will be an "open loop" card and may be used similarly to a debit card at many locations. In another embodiment the card will be a "closed loop" card and the customer will only be able to use the card at select locations, similar to a gift card for a particular store. In certain embodiments, the closed loop card may be converted to an open loop card. The card may also include a full-refund mechanism—in essence, a product return, but without the hassle of going back to the store.

Figure 3:
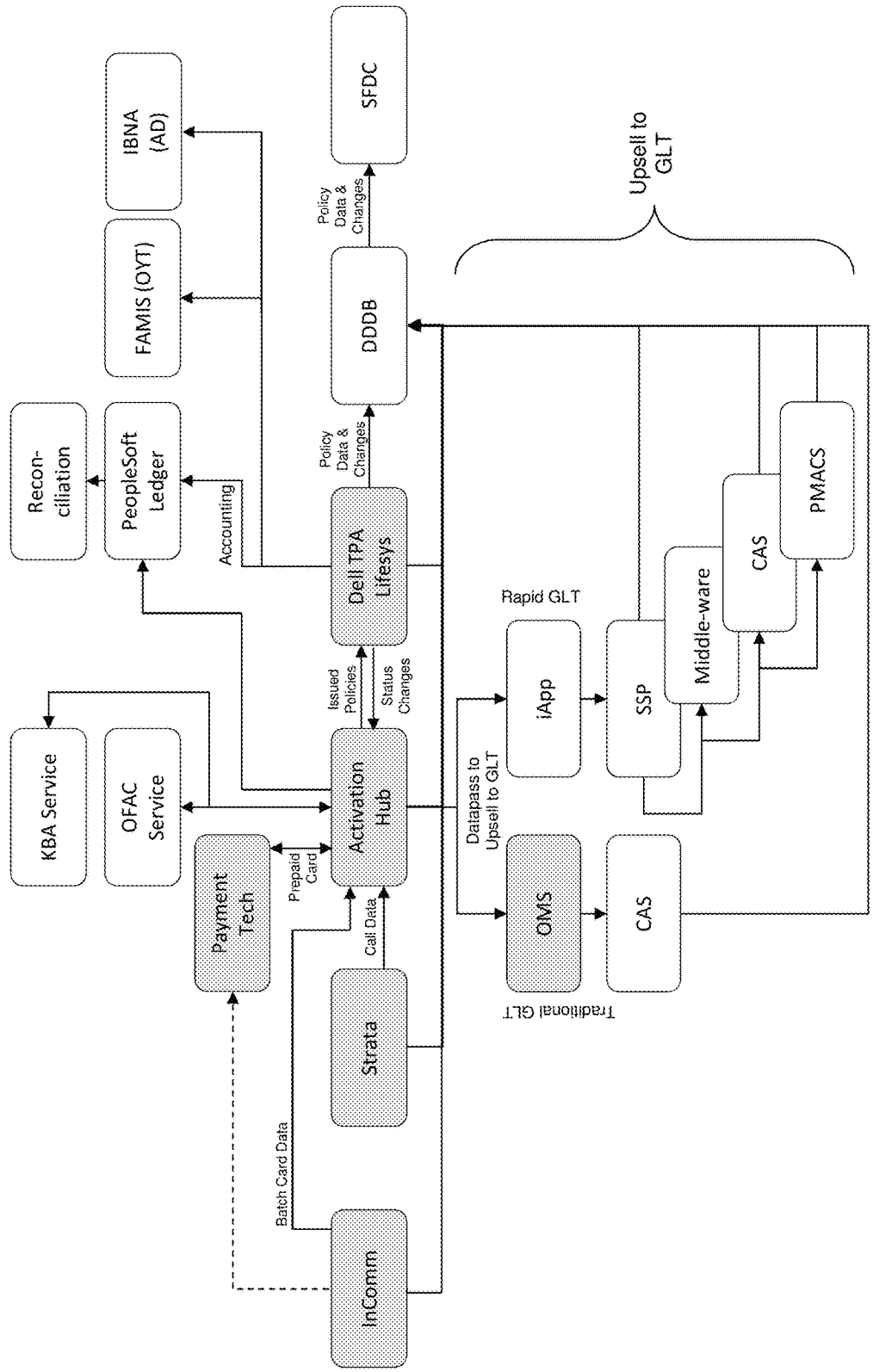
FIG. 3 provides a "day one" diagram describing initial processing blocks for the retail insurance product/system.

Turning now to FIG. 3, back-office processing features of the activation process are depicted in the function/flow chart of FIG. 3. In this diagram, logic flows from left to right and begins with the acquisition of data from the pre-paid card (InComm) block 300, with passage of fields to strata, block 310, Activation, block 320, Dell Lifesys, block 330, and Epsilon DDDB (replacing database), block 340.

Continuing with FIG. 3, a data pass is made to the up-sell module, blocks 350 and 360. Two paths are provided for the data. The first pass involves a traditional GLT product, through OMS block 350 and CAS, block 370. Once completed, this is passed back to the database, block 340 for tracking records. For a rapid up-sell process, logic is governed by iApp block 360, channeled through SSP, block 370, middleware block 380, second CAS block 390 and PMAC block 400; and ultimately back to database DDDB block 340.

Payment processing operations are linked to the Activation Hub, block 320 including pre-paid cards, block 325, OFAC service-block 335 and KBA service, block 345.

Following the Activation Hub, policy issues with updates, Dell TPA block 330, and records and accordingly triggered via connections to Peoplesoft Ledger block 355, FAMIS block 375 and IBNA block 385. Records reconciliation is completed at block 365.

Figure 4:
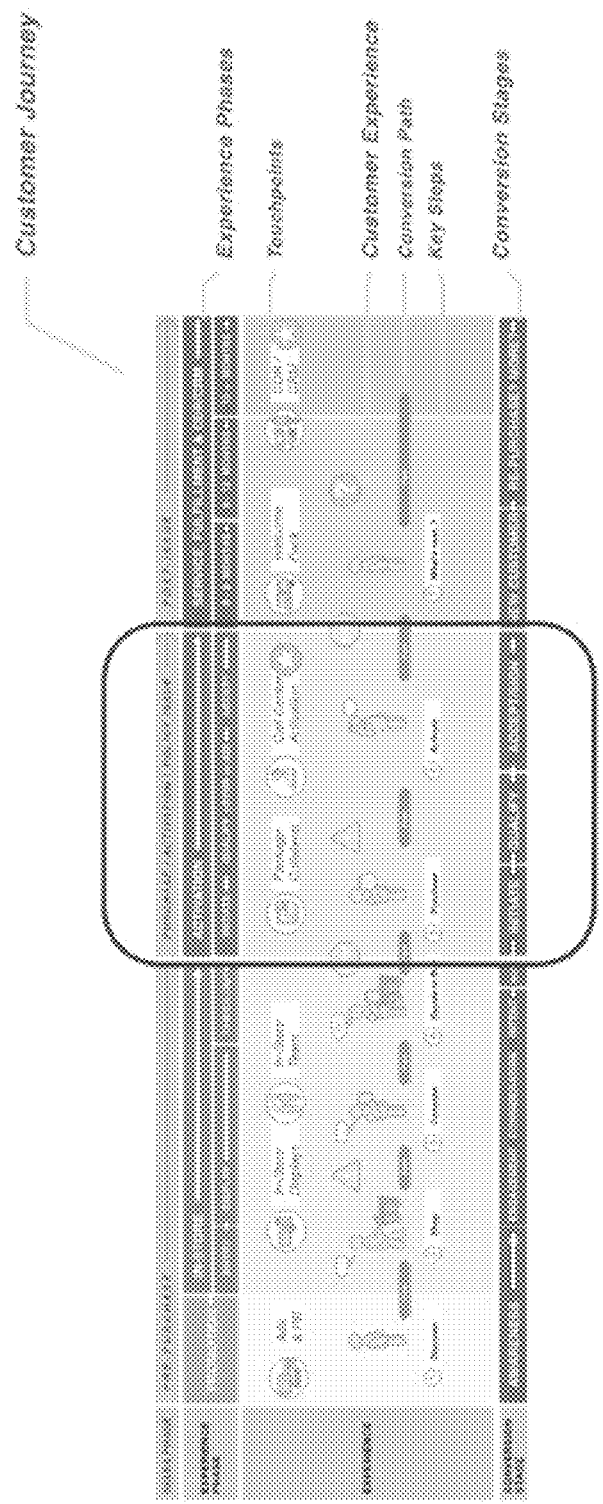
FIG. 4 depicts the in-store display with pre-packaged products for retail sale.
Figure 5:
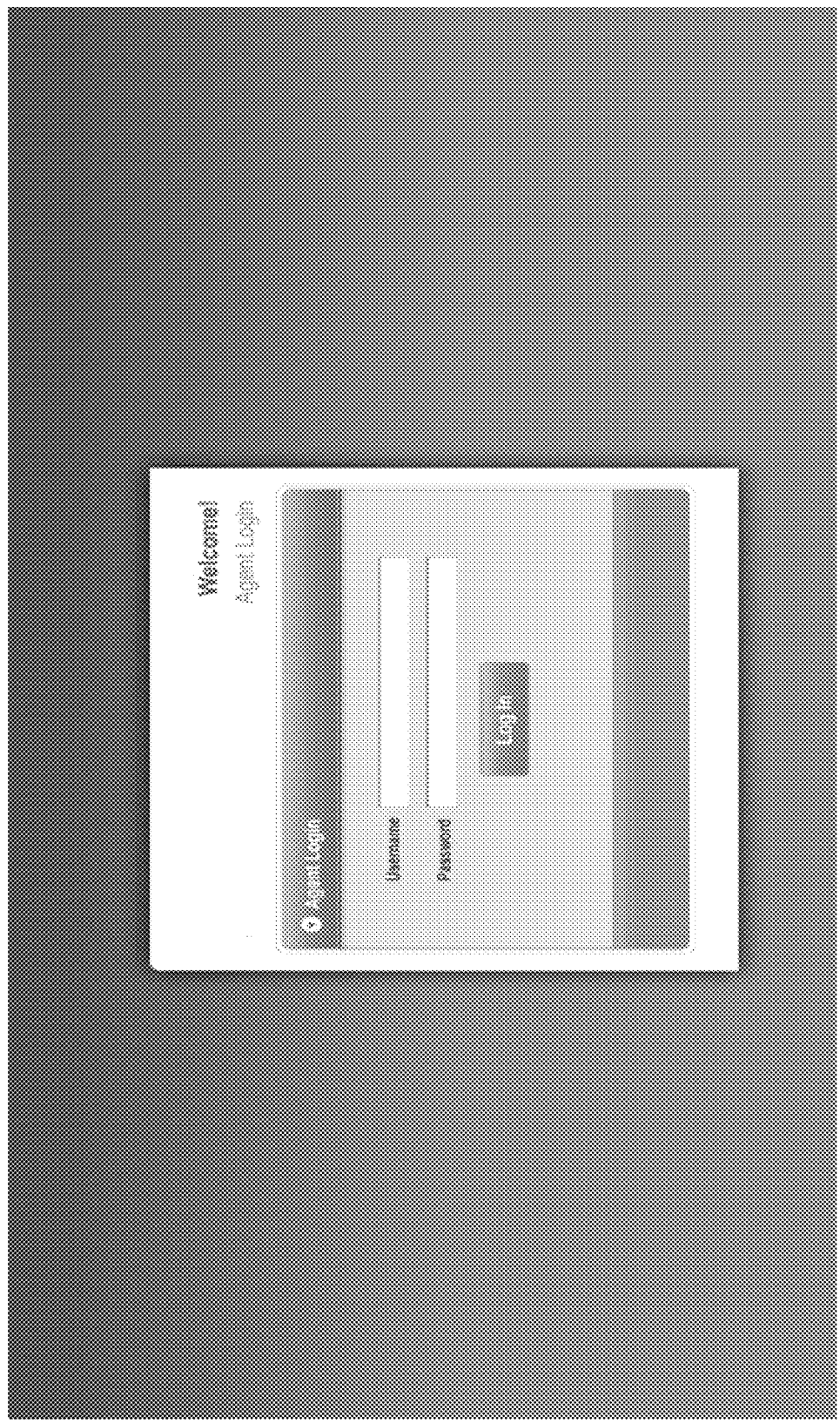
Figure 6:
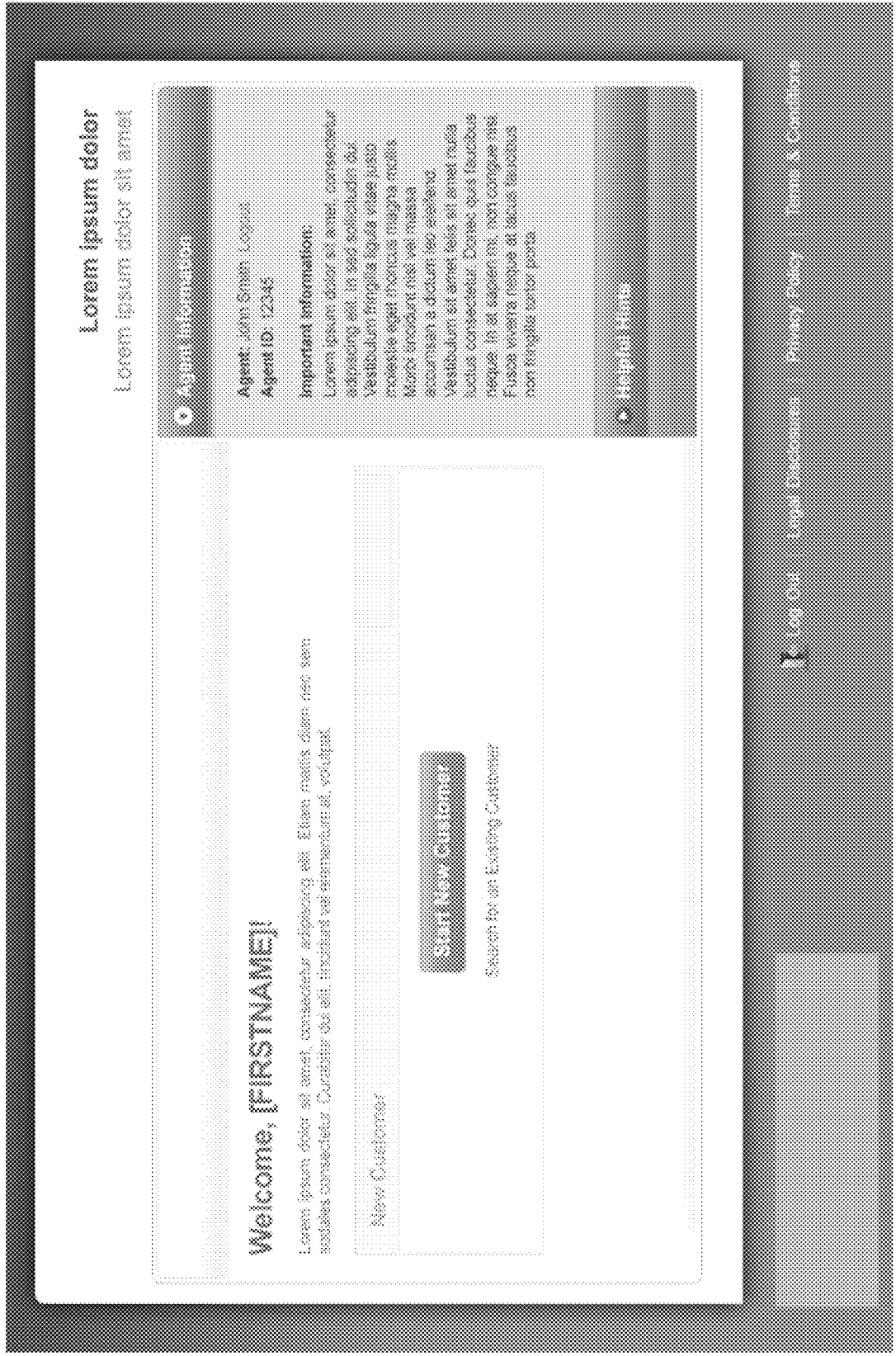
Figure 7:
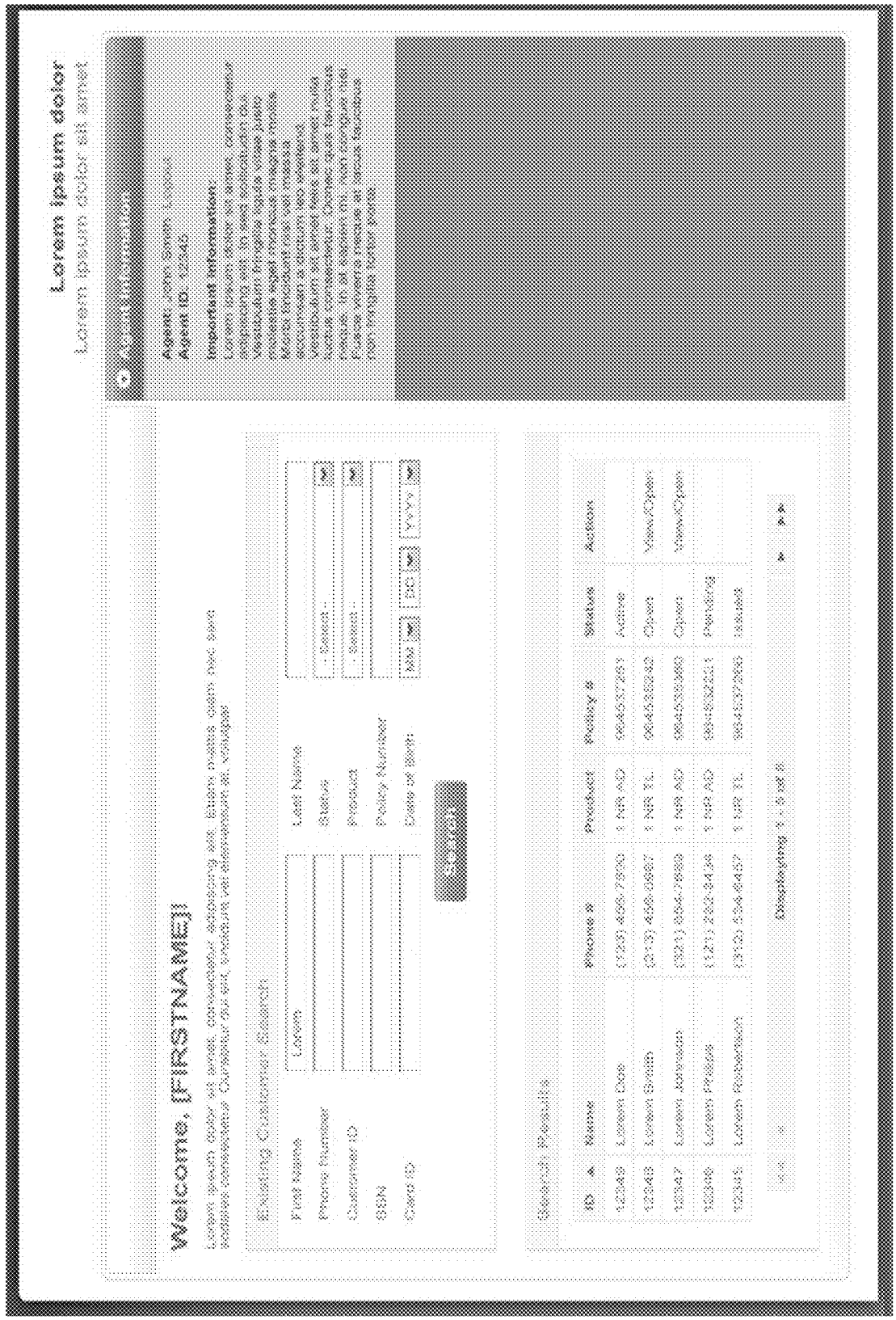
Figure 8:
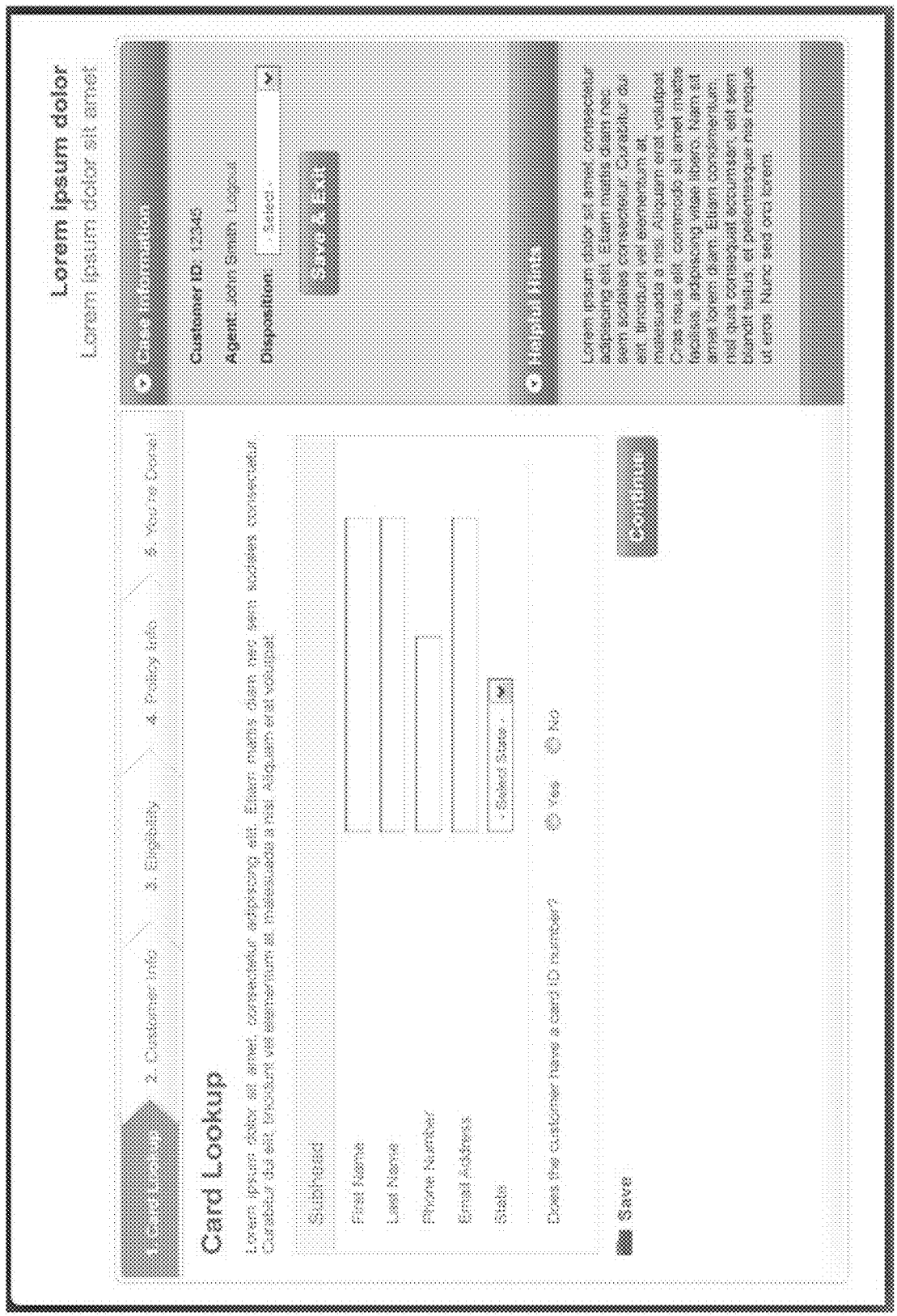

Turning now to FIG. 4, an in-store display is depicted for the retail promotion of a term life insurance product. In this arrangement, two price levels are provided in a single one year plan at a set amount. These price levels are set by age ranges. In this arrangement, a purchaser will pick up the box that includes the desired age range—and ultimately checkout. An example of various level/arrangements that can be used is provided below.

TABLE II

Starter Protection - Product Descriptions
One-year term with default to Accidental Death

| Coverage | Age 18-44 | Age 45-54 | Age 55-59 | Age 60-65 |
|---|---|---|---|---|
| $10,000 | $69 | $99 | $149 | $199 |
| $25,000 | $99 | $179 | $279 | $429 |

In accordance with this retail purchase arrangement, the following attributes for the pre-paid insurance are identified as part of the product as sold:

TABLE III

Features

Simplified Issue Product
6 qualifying questions (i.e., cancers, diabetes, heart-disease, etc.)
If customer does not qualify, he/she is covered by an Accidental Death policy at a greater coverage amount
Ability to convert starter product premium to traditional product if converted at activation
Provides term coverage to a large number of customers with a provision to cover every customer with some insurance product In FIG. 5, the connection between the retail purchase, block 500 with subsequent conversion steps is diagrammed as part of the Customer Journey. The path includes multiple touch points with the provider to permit extended services and assistance in the purchase process.

FIGS. 6-31 are screen displays for navigating the activation process, after the actual purchase is completed. In this illustration, a licensed insurance agent accomplishes the activation of select policy attributes. A licensed agent may be required to issue disclosures and proper guidance for any purchases and/or upgrades of certain policies. The operation is somewhat self-evident for the context of each screen and will not be discussed further here, but the written descriptions in each screen display are incorporated by reference as if restated here in full and in association with each display.

Figure 10:
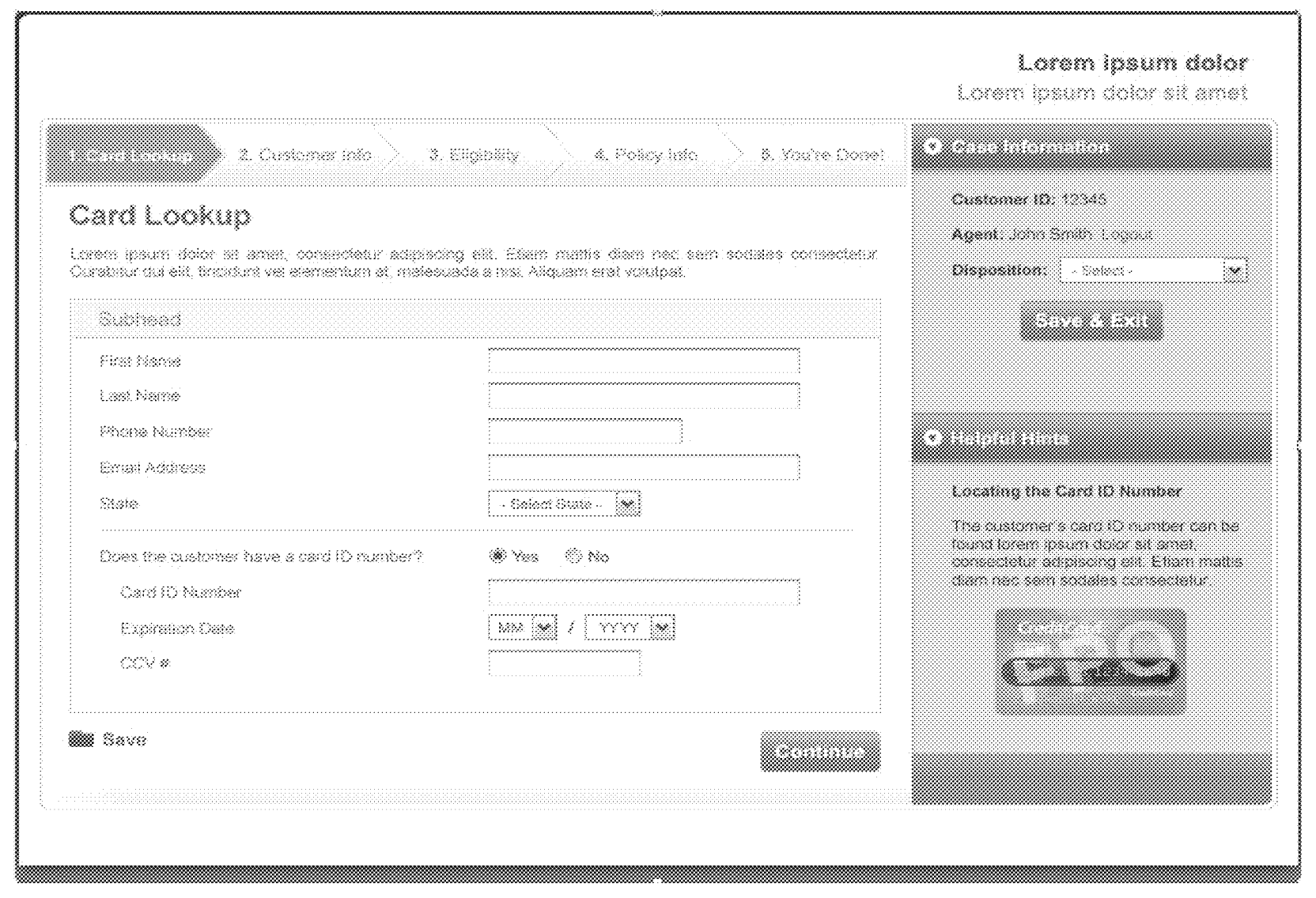
Figure 11:
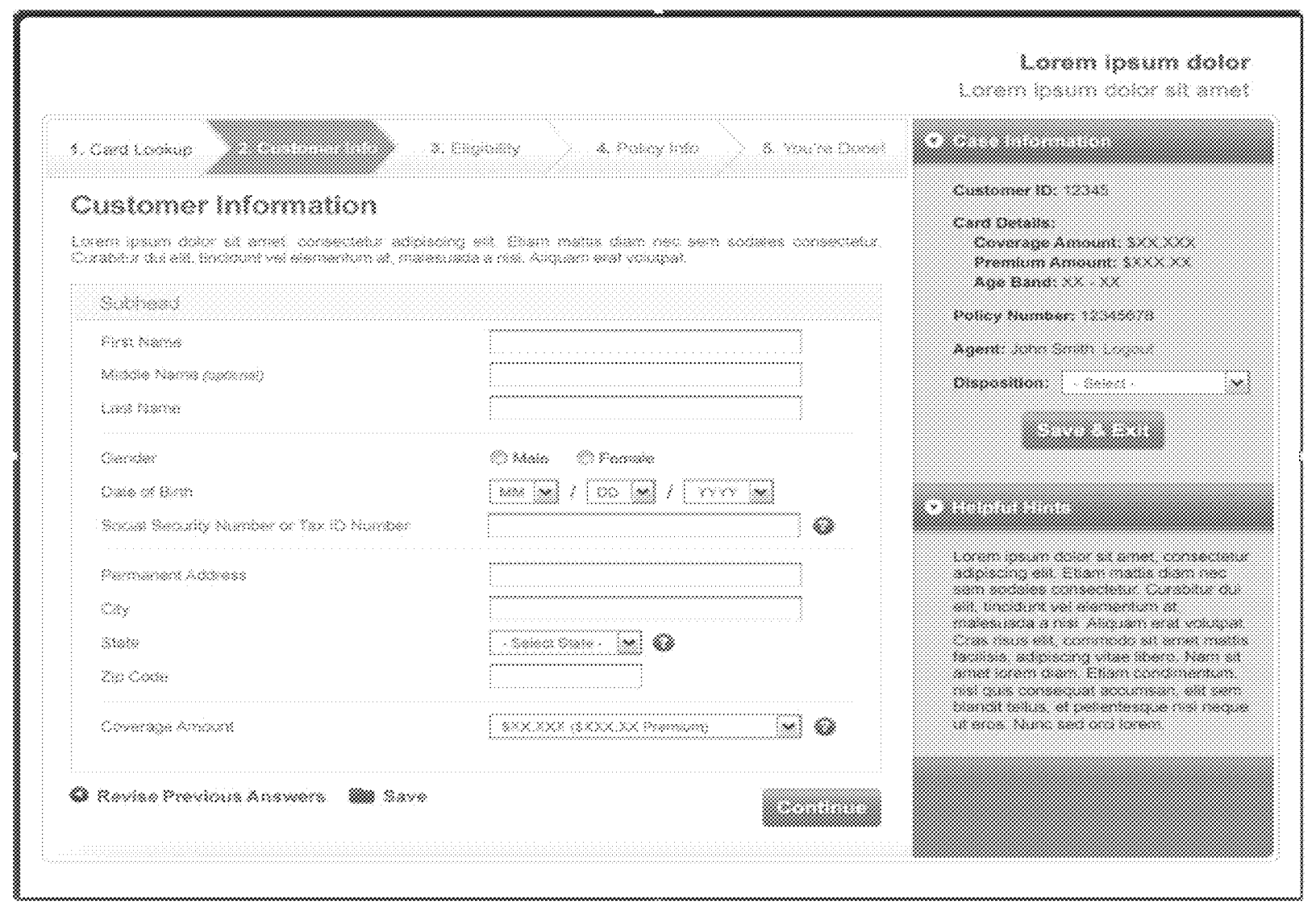
Figure 12:
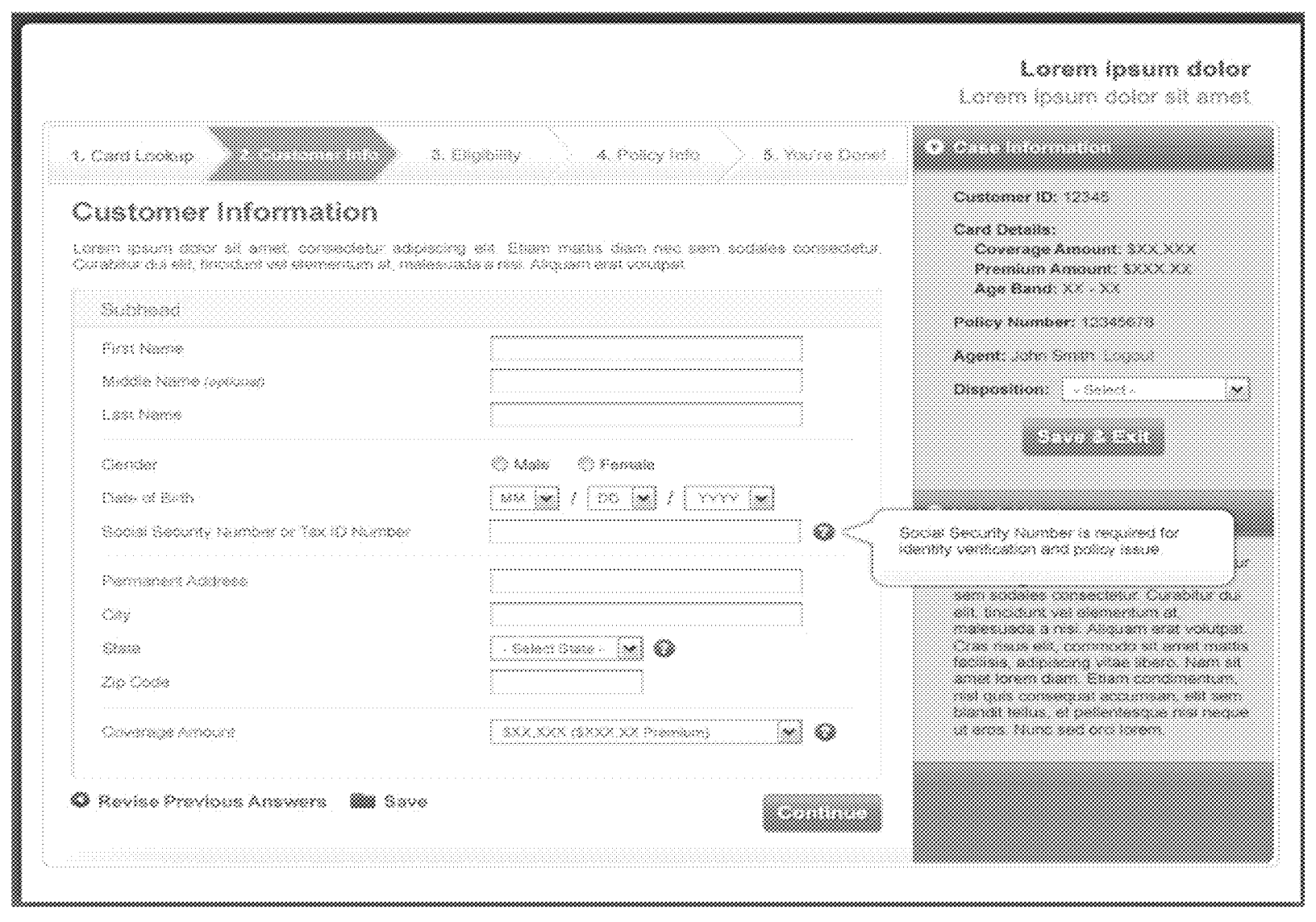

The first pass includes card look-up operations with assistance under "Helpful Hints"; see FIG. 10. At FIG. 11, customer information is collected, including information taken from the card, shown under "Case Information." Missing data, e.g., SS Number, is flagged, FIG. 12.

Figure 13:
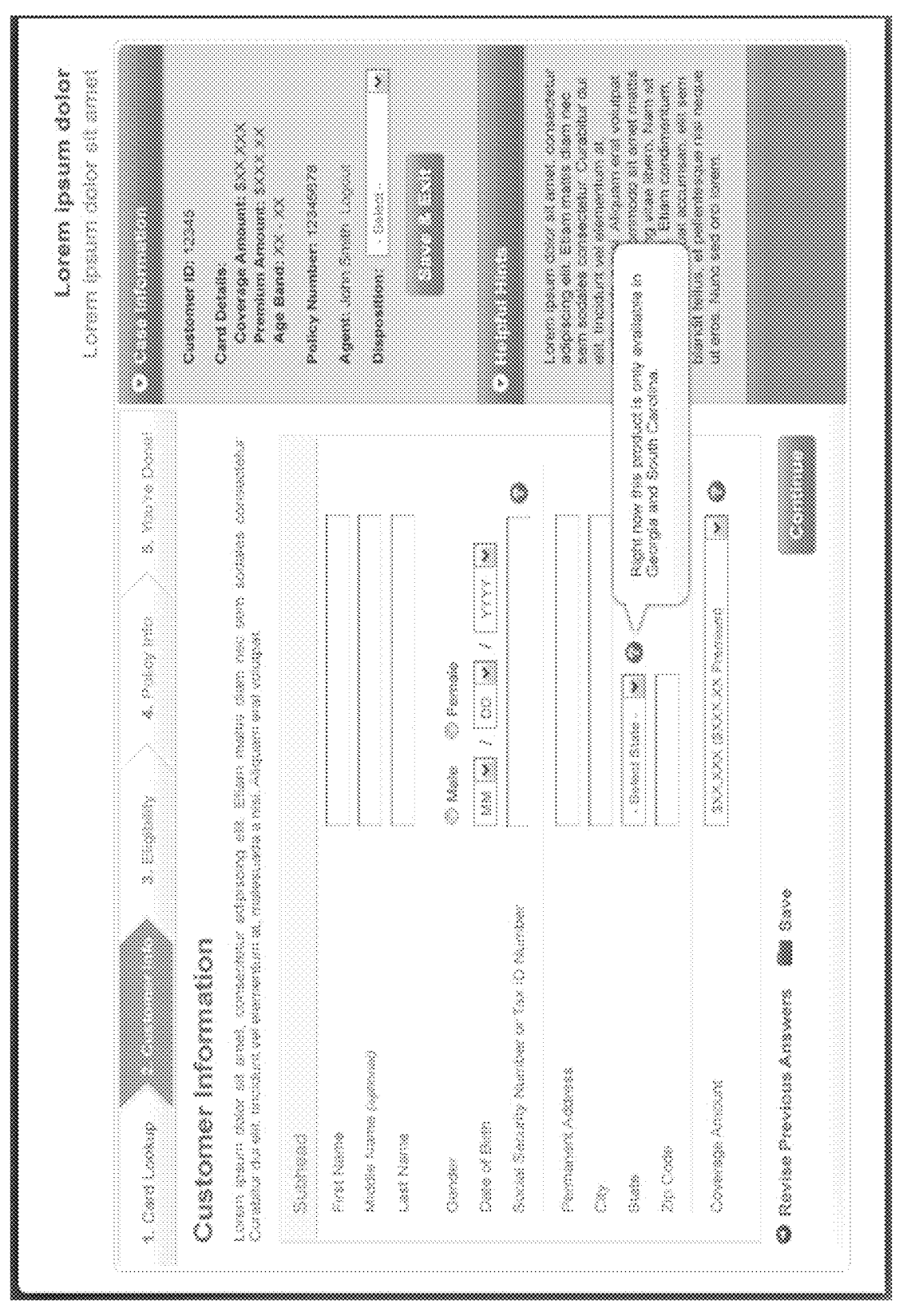
Figure 14:
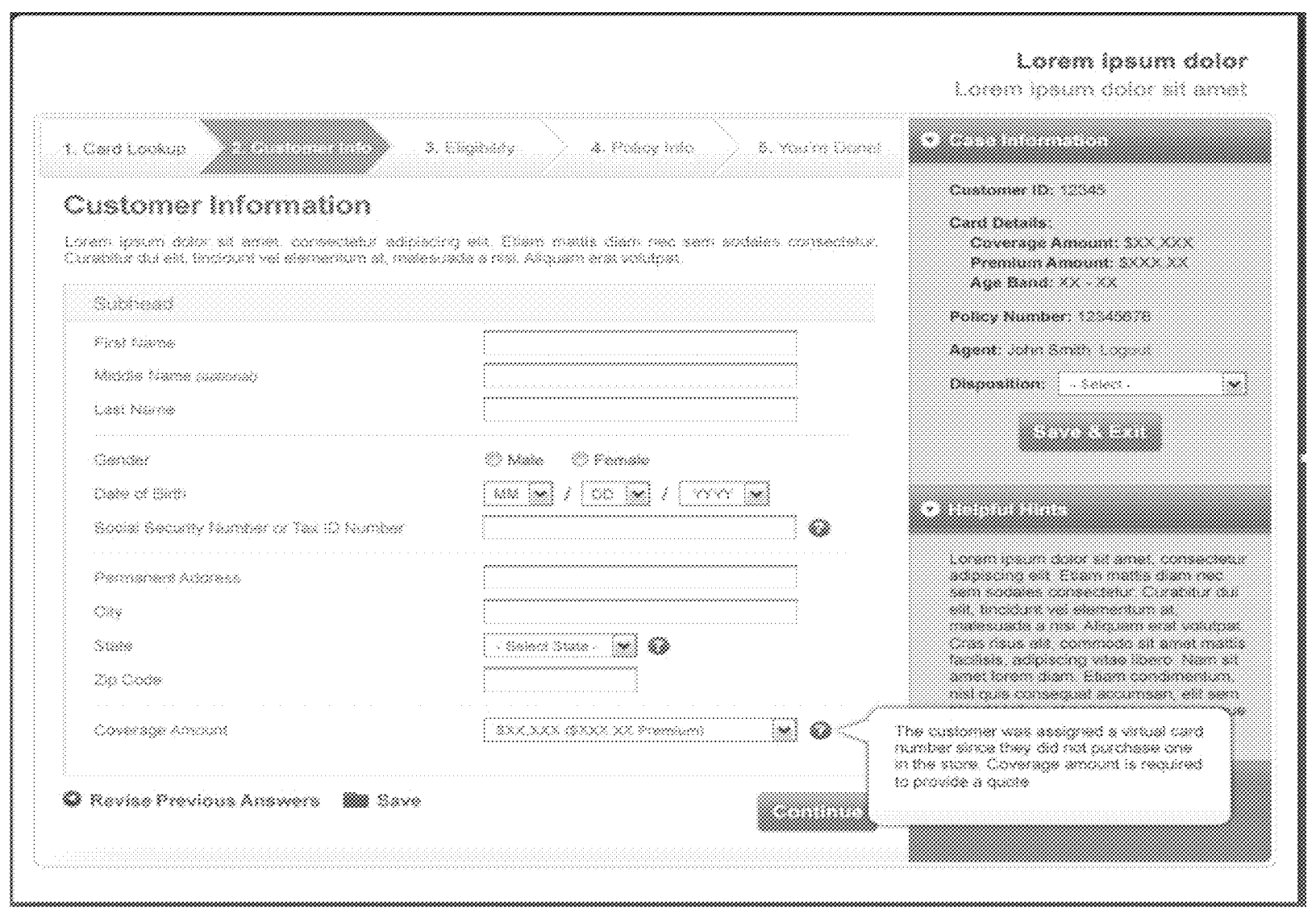

Similarly, in FIG. 13, selection of the "state" triggers a check of current regulatory conditions in that state for the product identified. All insurance is subject to approval at the state level and confirmation of this is important in assessing candidate policies. In FIG. 14, the creation of a virtual card is triggered if a customer lost or never purchased the retail card. Absent a card number, coverage must be entered as indicated.

Figure 15:
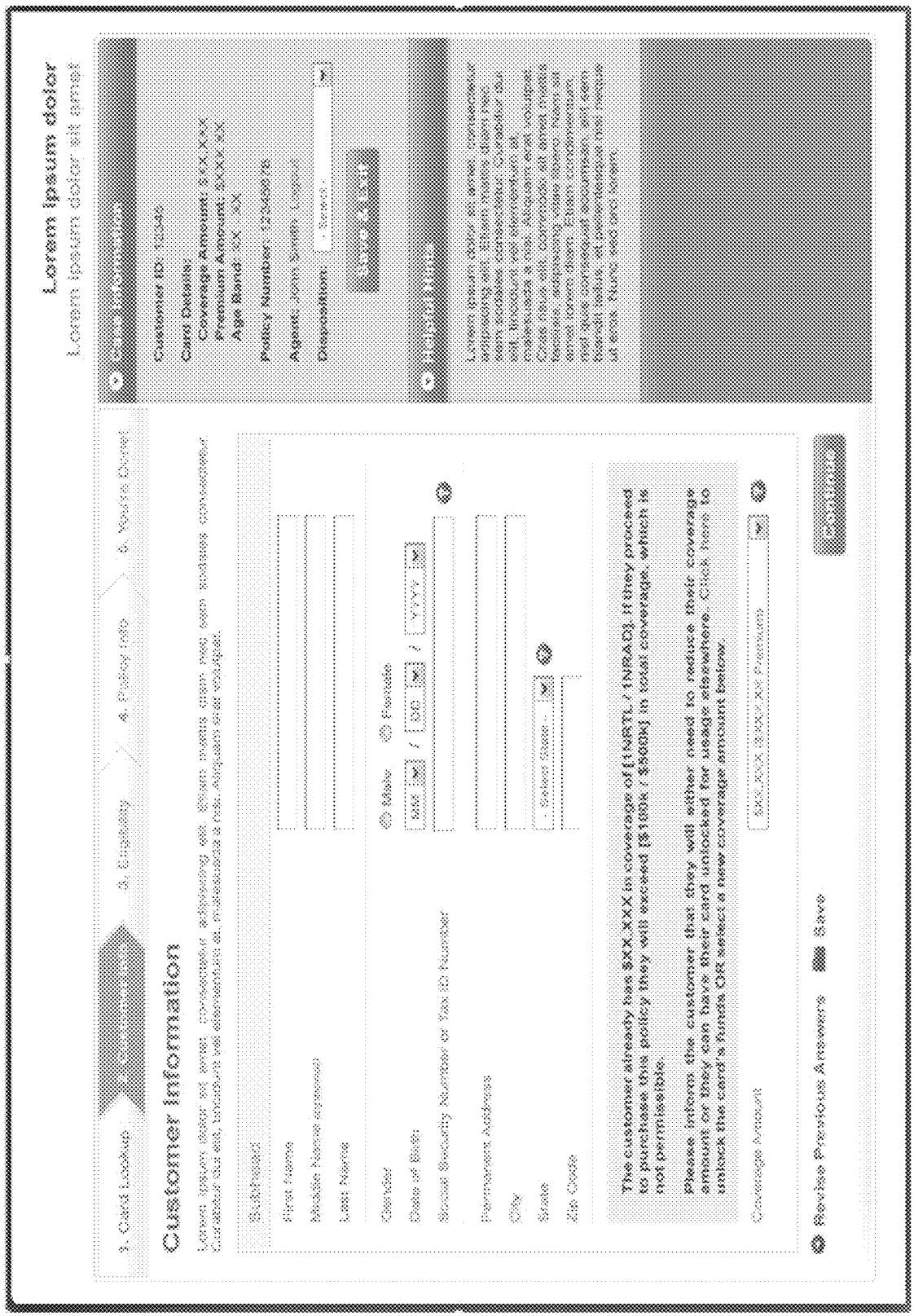
Figure 16:
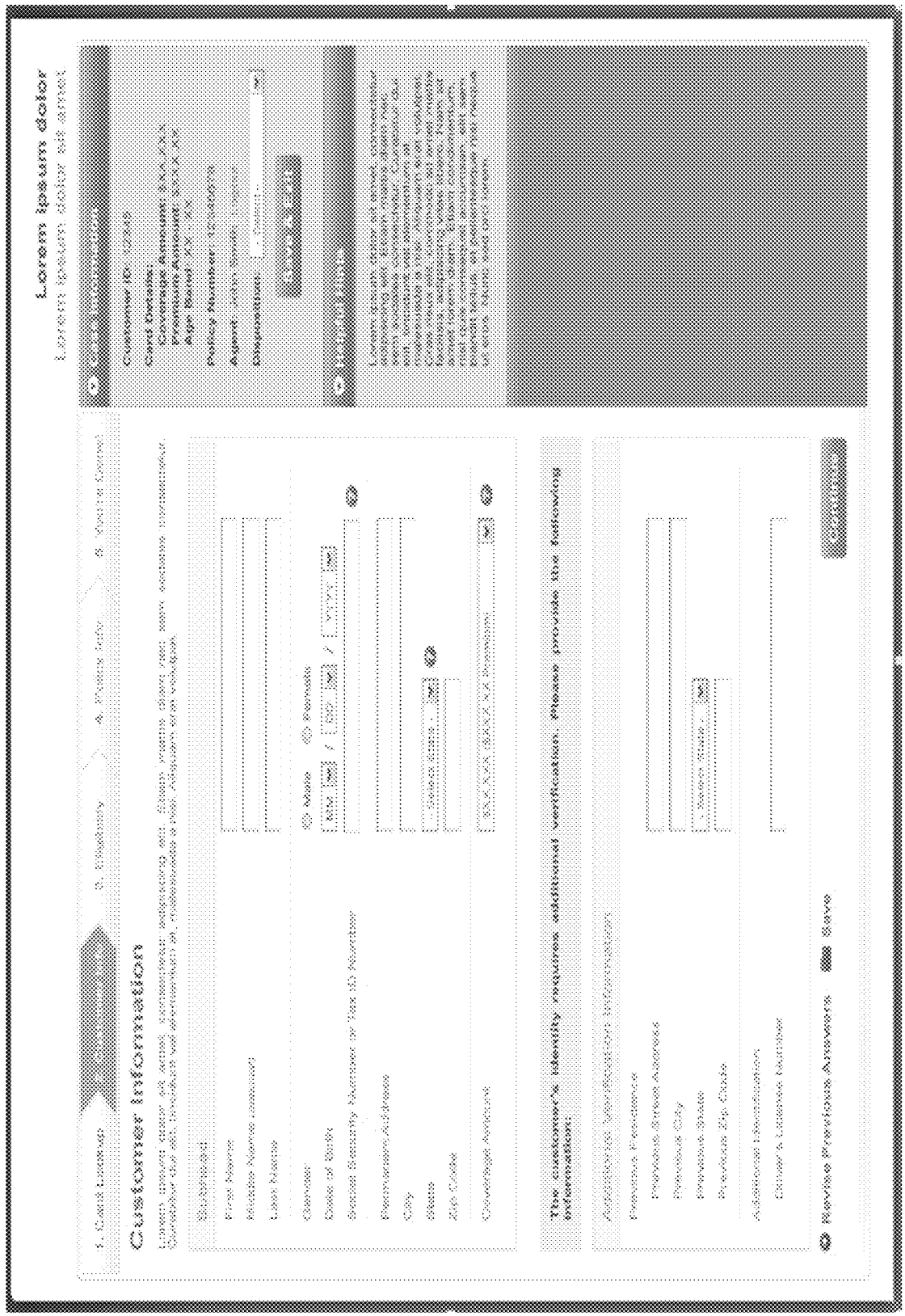
Figure 17:
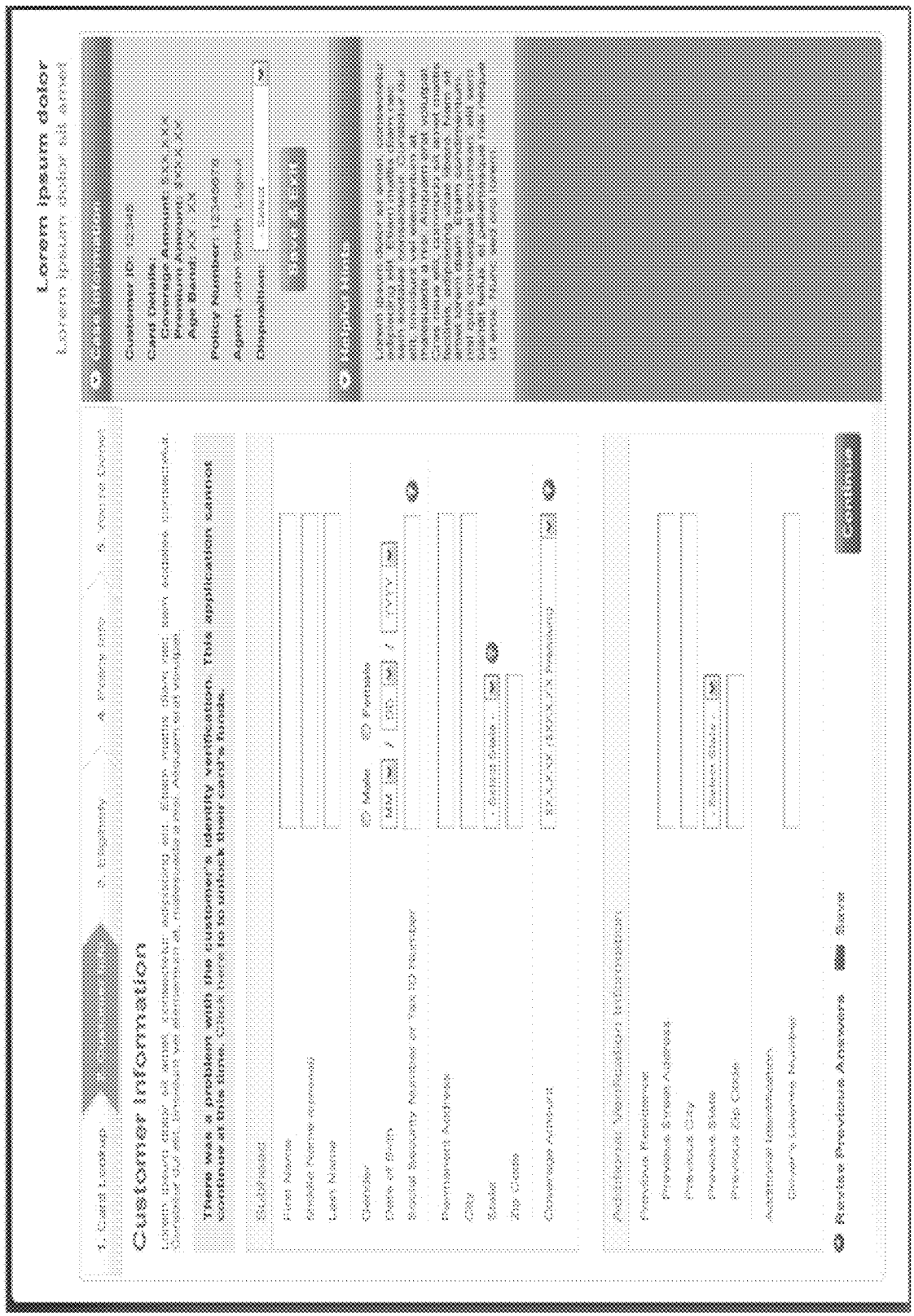

Further checks are reflected at FIG. 15 where the new request is matched against various policies. If the total exceeds the current limits, a message is displayed to the agent. Similarly, in FIG. 16, when the system needs more data, this is required.

Figure 18:
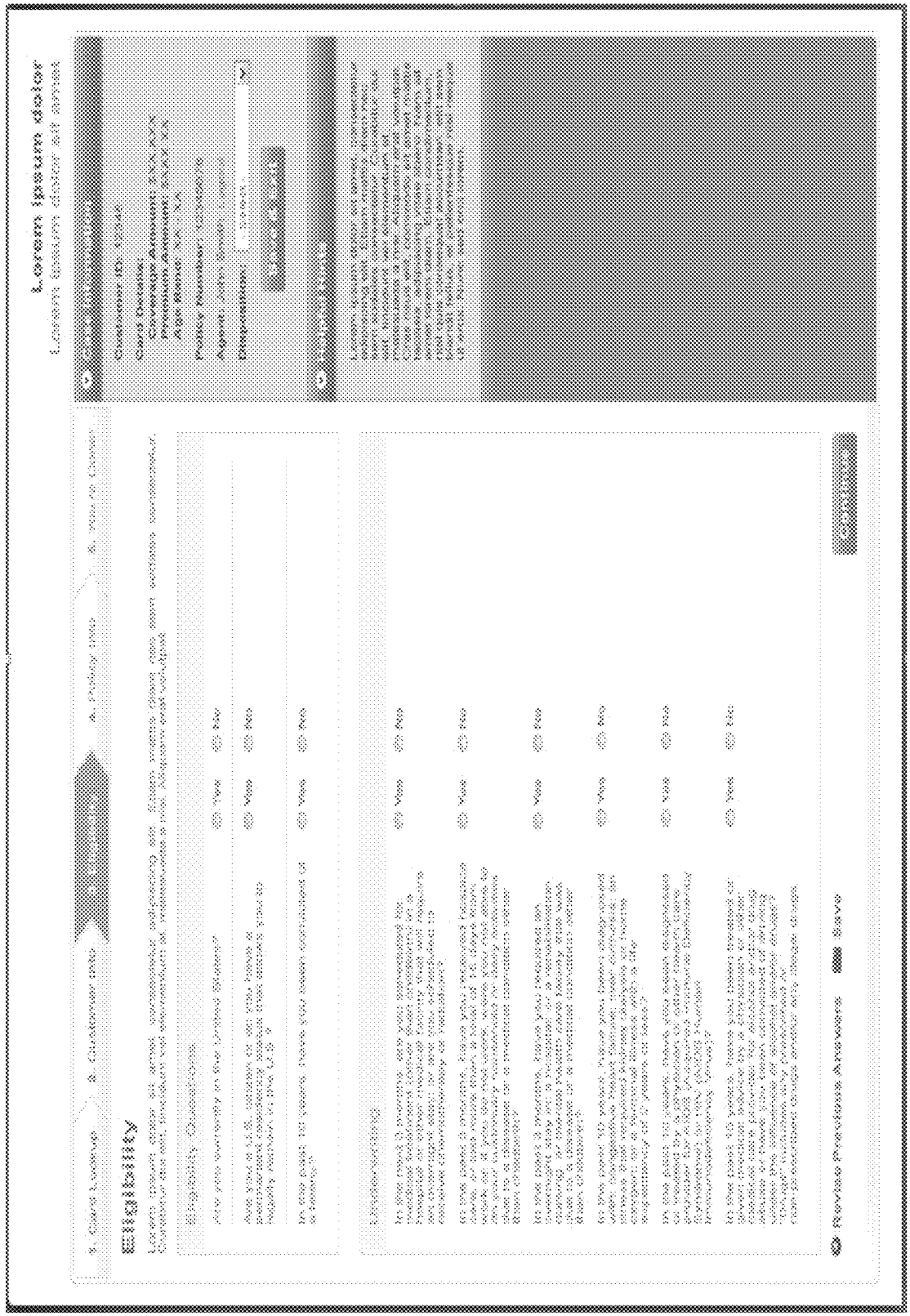
Figure 19:
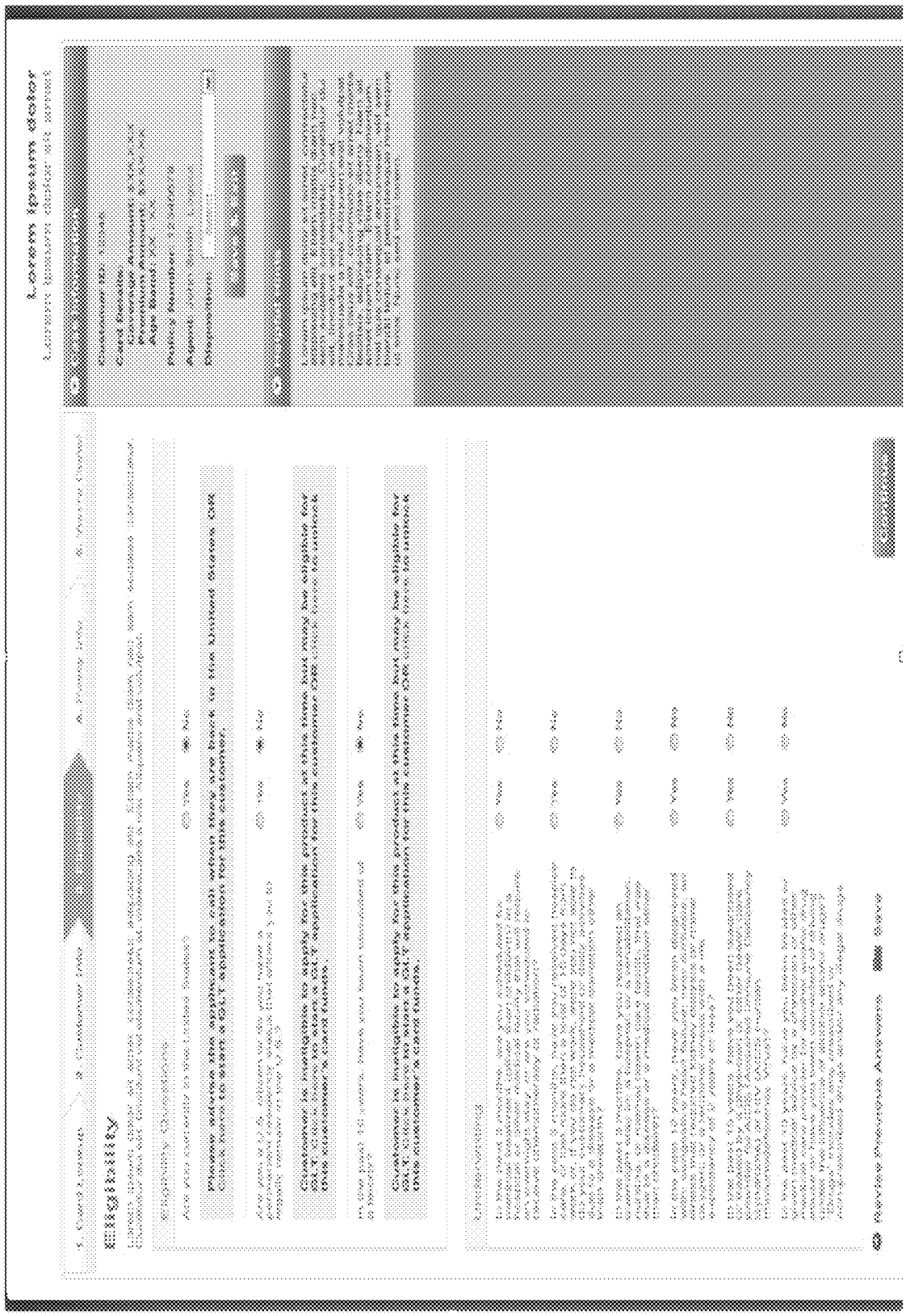
Figure 20:
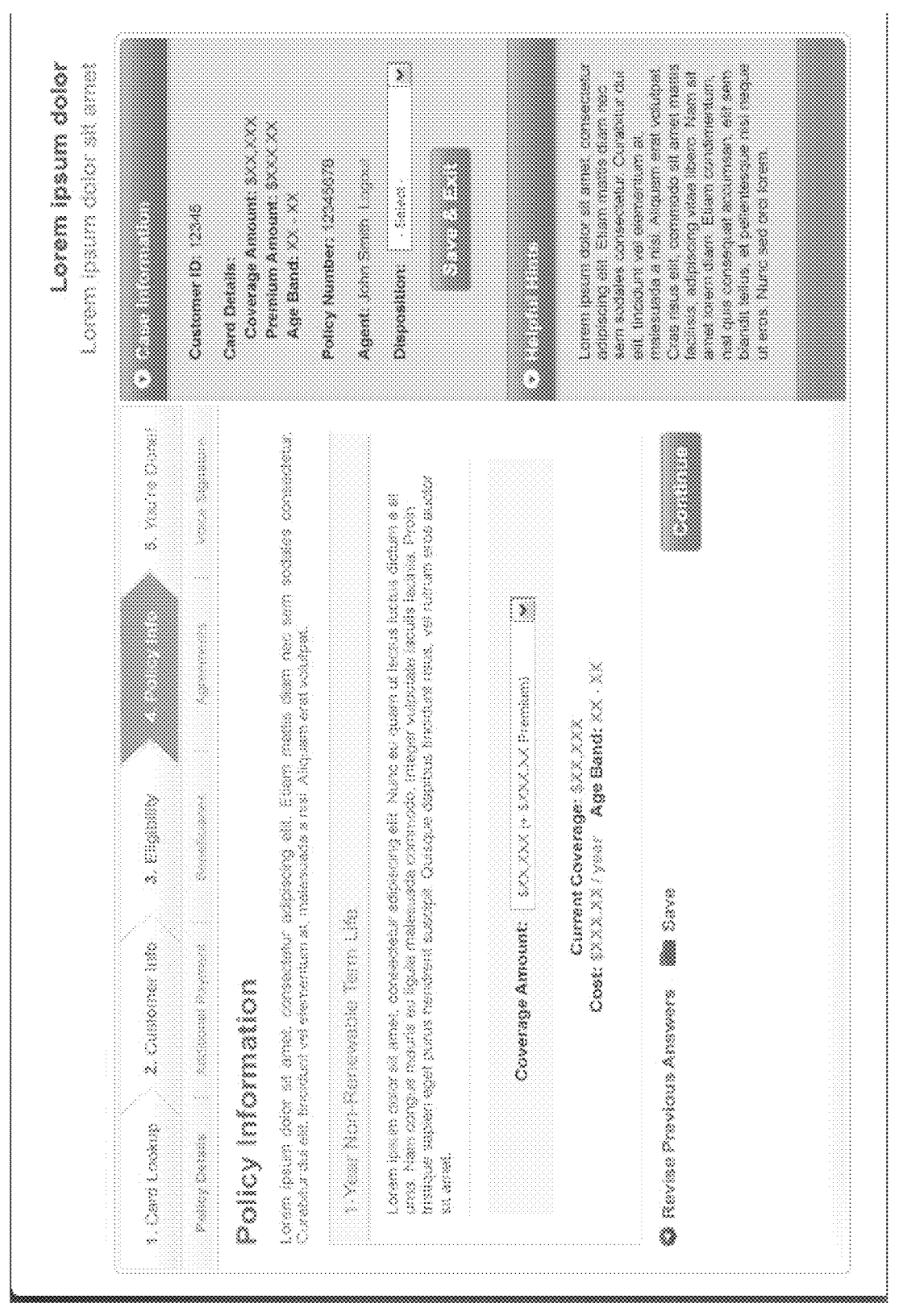
Figure 21:
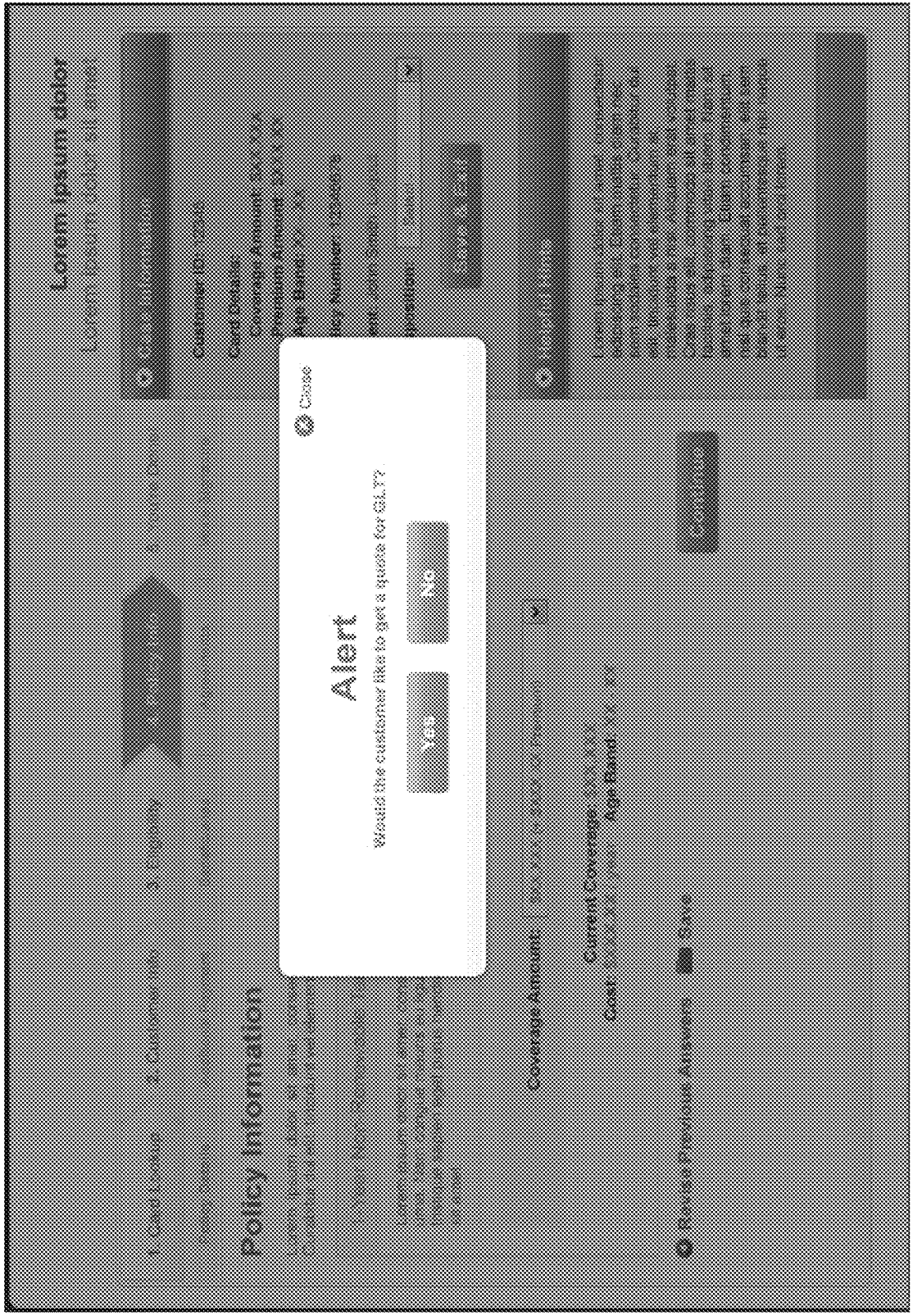
Figure 22:
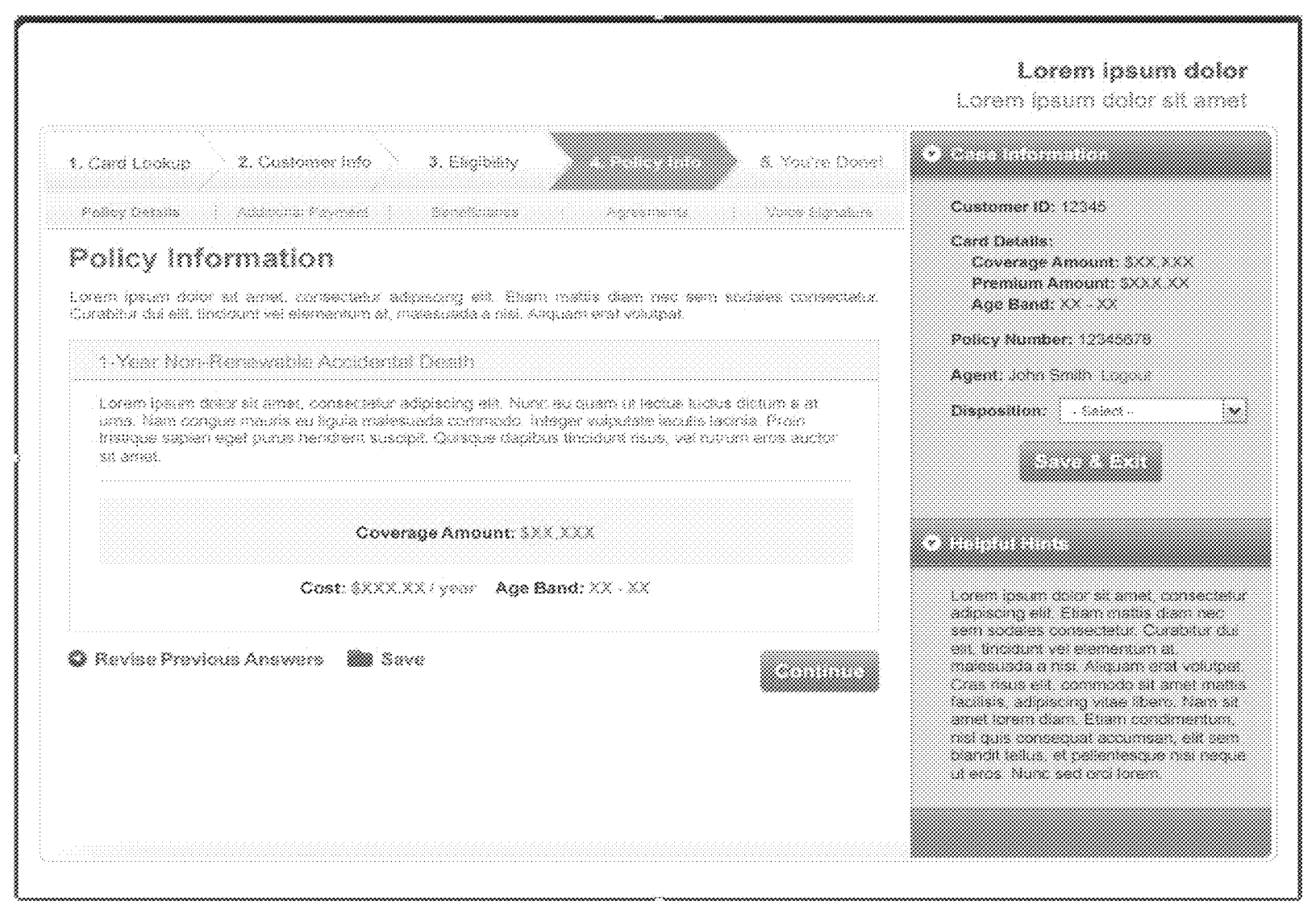
Figure 23:
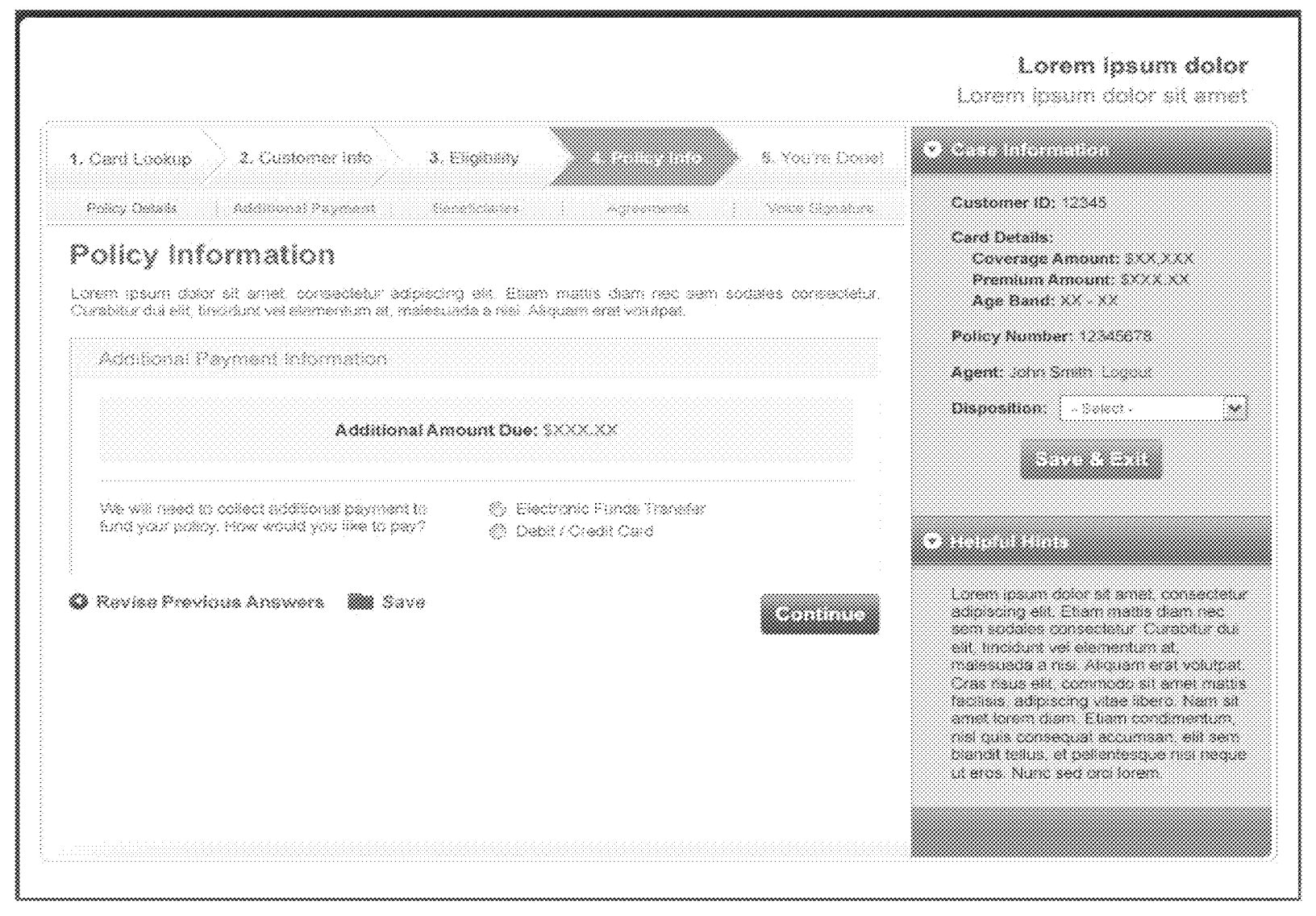
Figure 24:
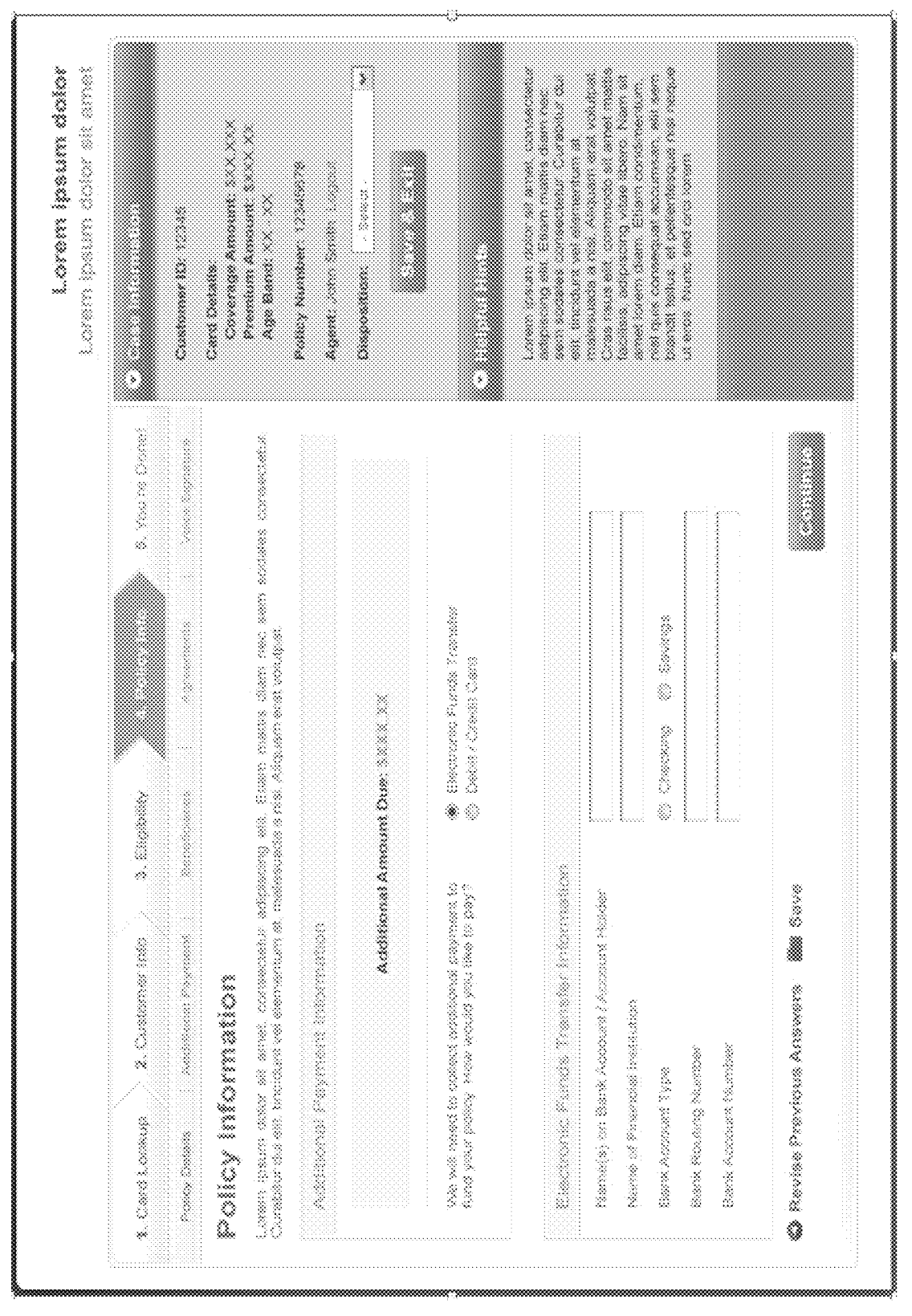
Figure 25:
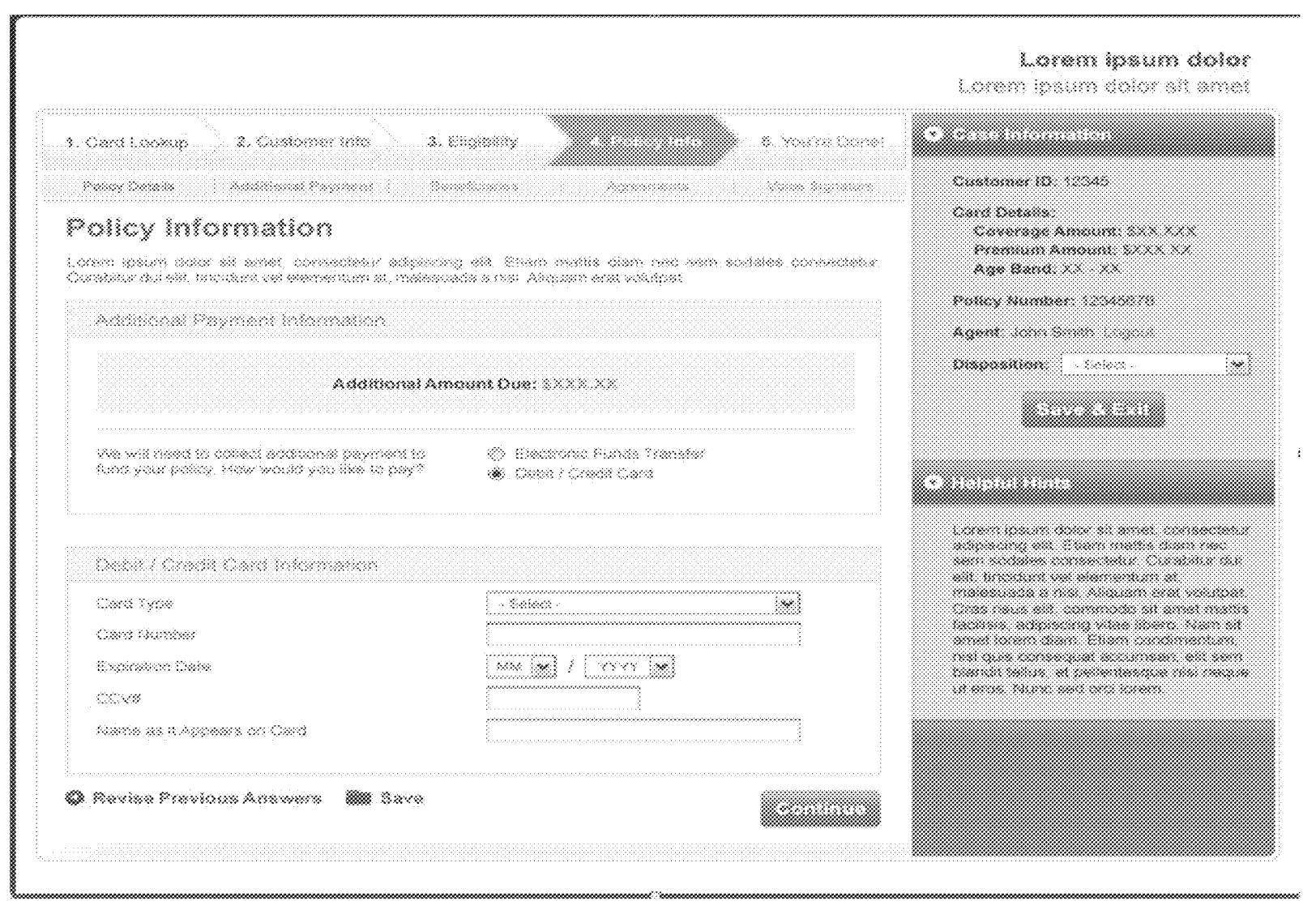

Turning now to FIG. 18, an illustration underwriting questionnaire is depicted. Per the product characteristics, the depth of questioning is contingent on the type of product and the amount of coverage. Once completed, the Policy Info screen, FIG. 20, provides details regarding the policy parameters. The final aspect of this process involves the up-sell opportunity—a GLT policy in this case, FIG. 21. At FIG. 22, the policy type shifts to non-renewable Accidental Death, with key aspects of this policy credential as depicted in FIG. 23. This includes various choices such as funding mechanisms, FIG. 24 (EFT) or FIG. 25 (debit/credit card).

Figure 26:
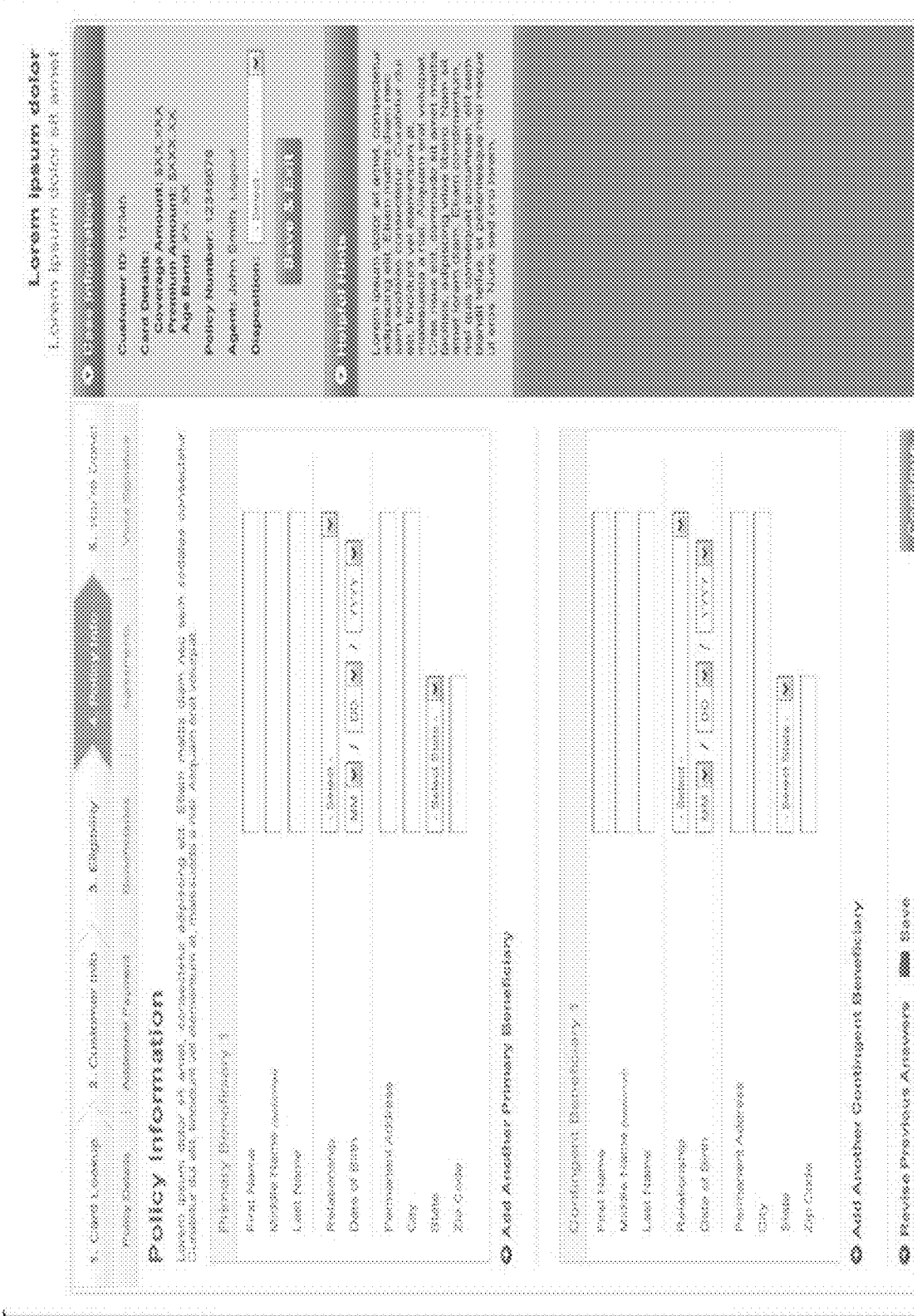
Figure 27:
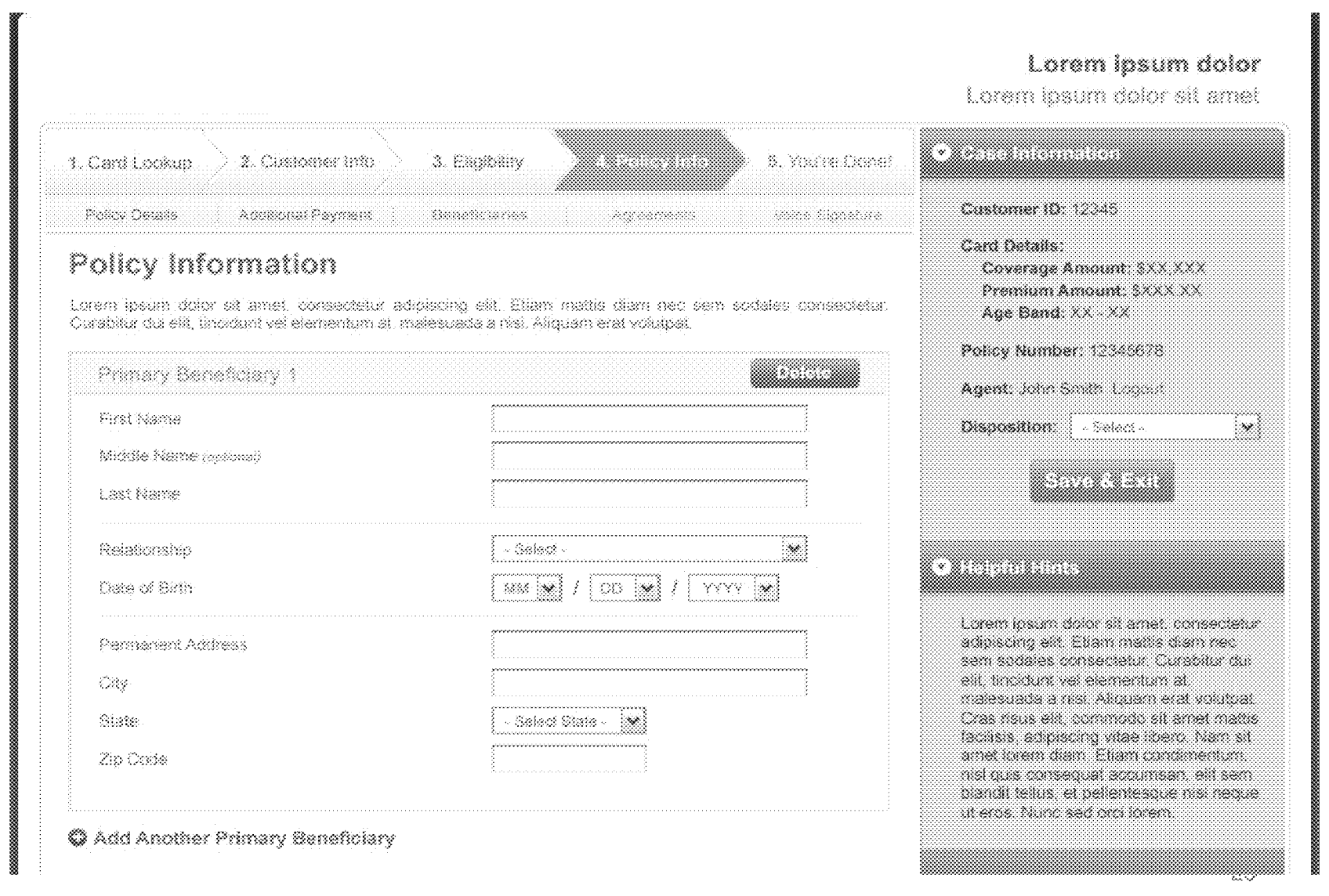
Figure 28:
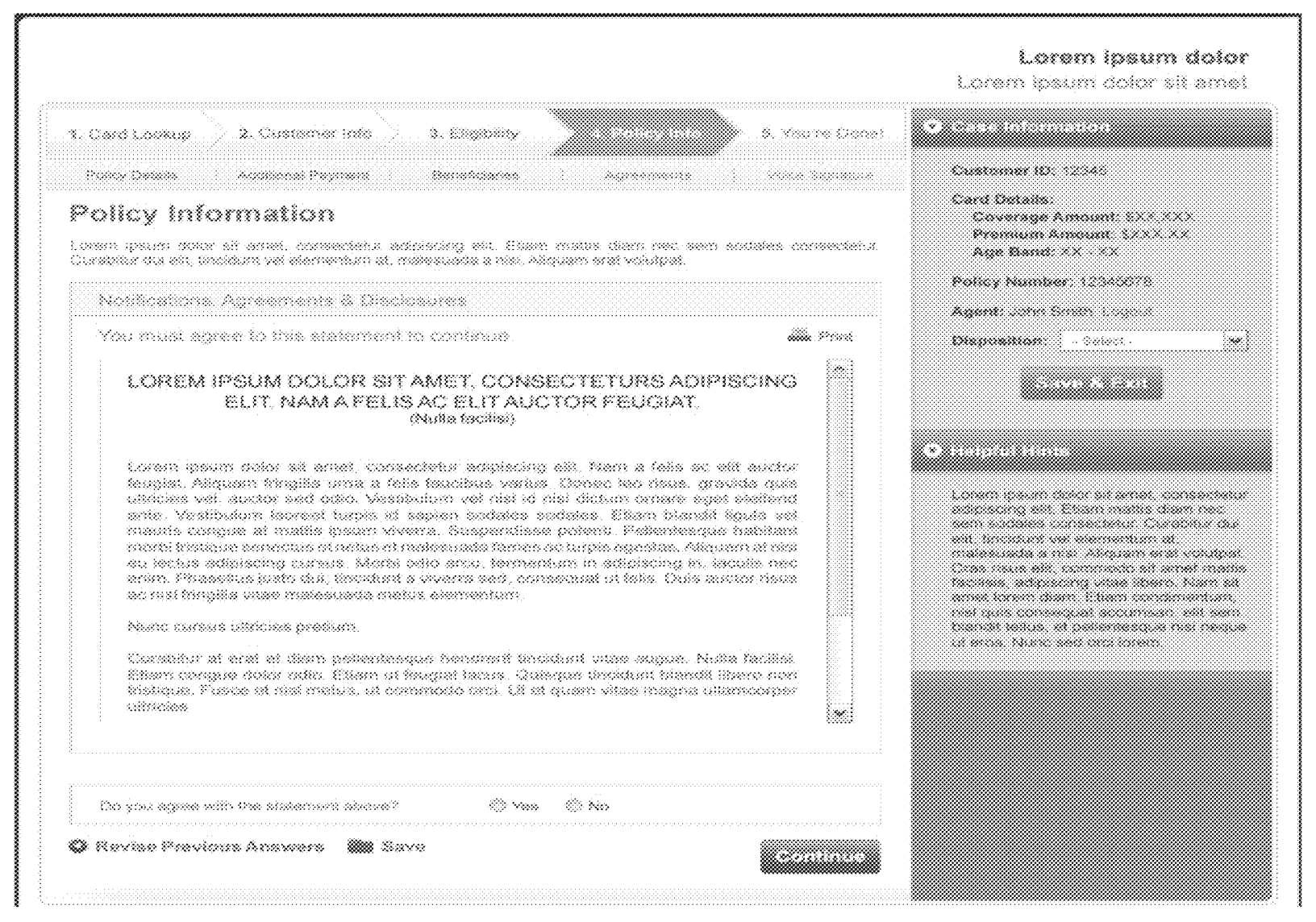
Figure 30:
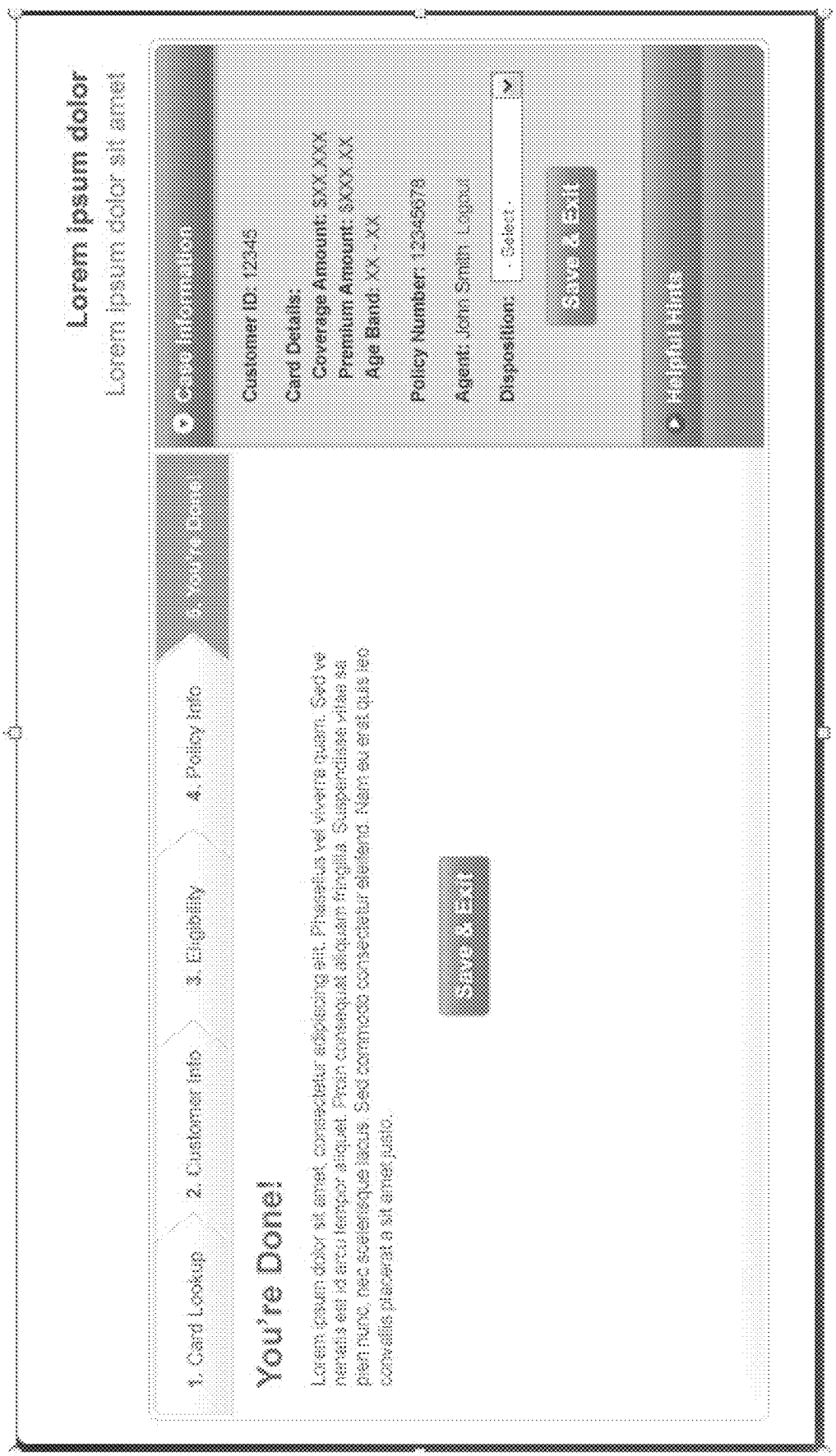
Figure 31:
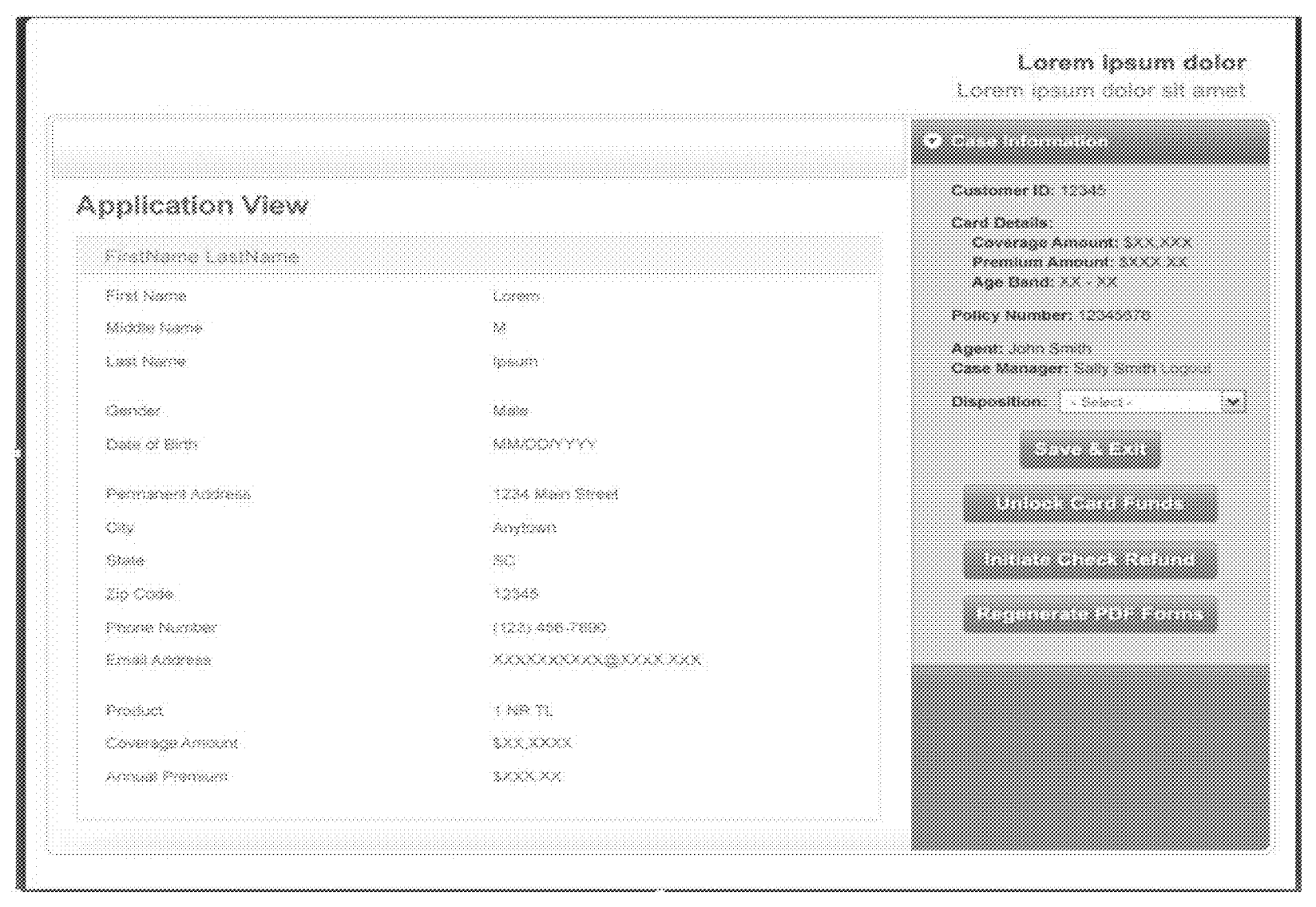
Figure 32B:
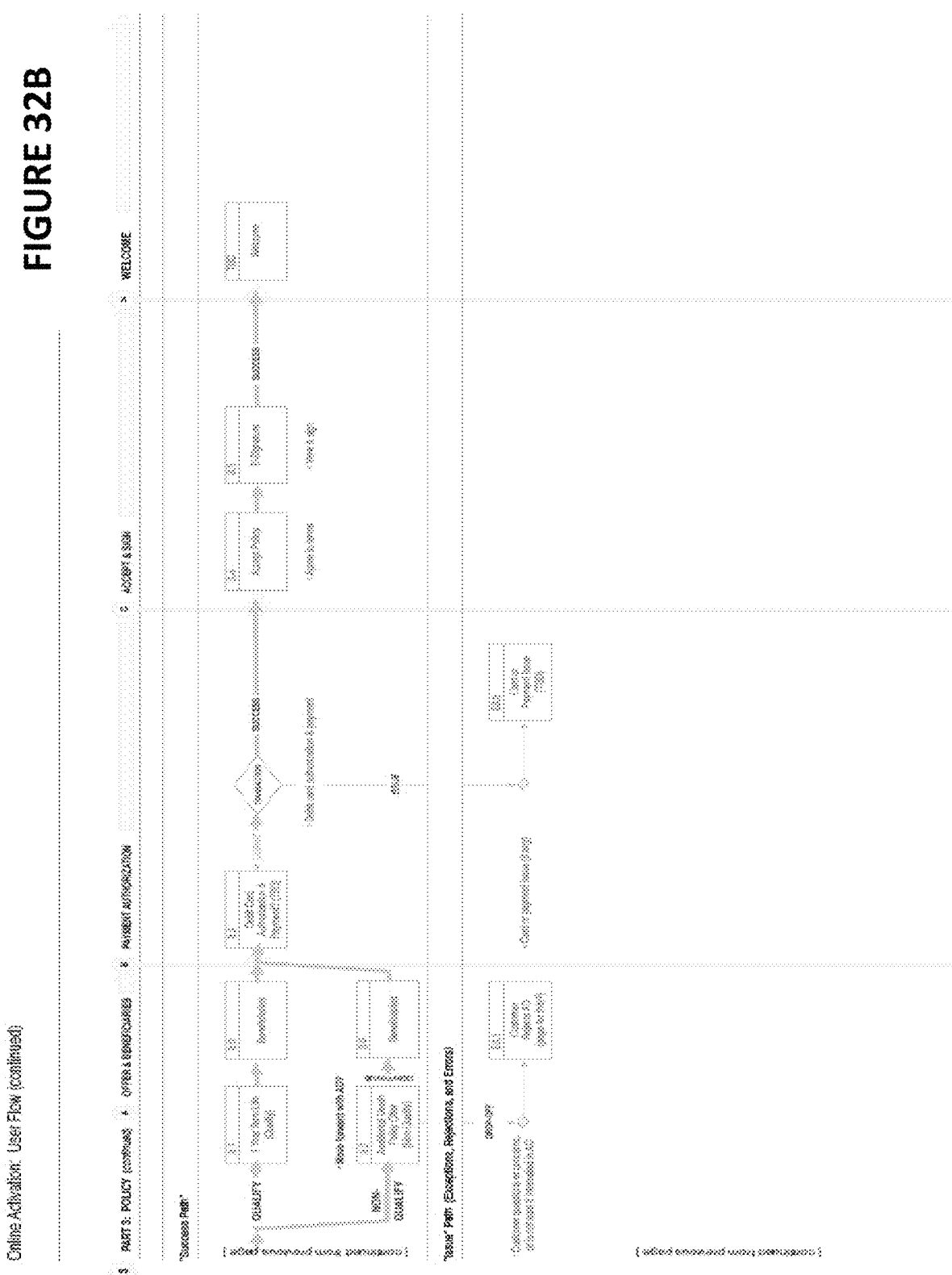

Continuing with FIGS. 26 and 27, additional policy data is collected (beneficiaries); at FIG. 28, confirmation and agreements are entered, with the process conclusion at FIG. 30. A simple summary page is depicted in FIG. 31.

The foregoing on-line activation process is supported by server-based programming as depicted in the next series of diagrams. First turning to FIGS. 32A and 32B, a "USER FLOW" schematic extends horizontally, reflecting the processing that underlies the screen displays from the Landing page, through Basic Info, the "Questions," the Policy, and ending with confirmation. In this depiction, both "issue" and "success" paths are presented running in parallel.

Figure 33A:
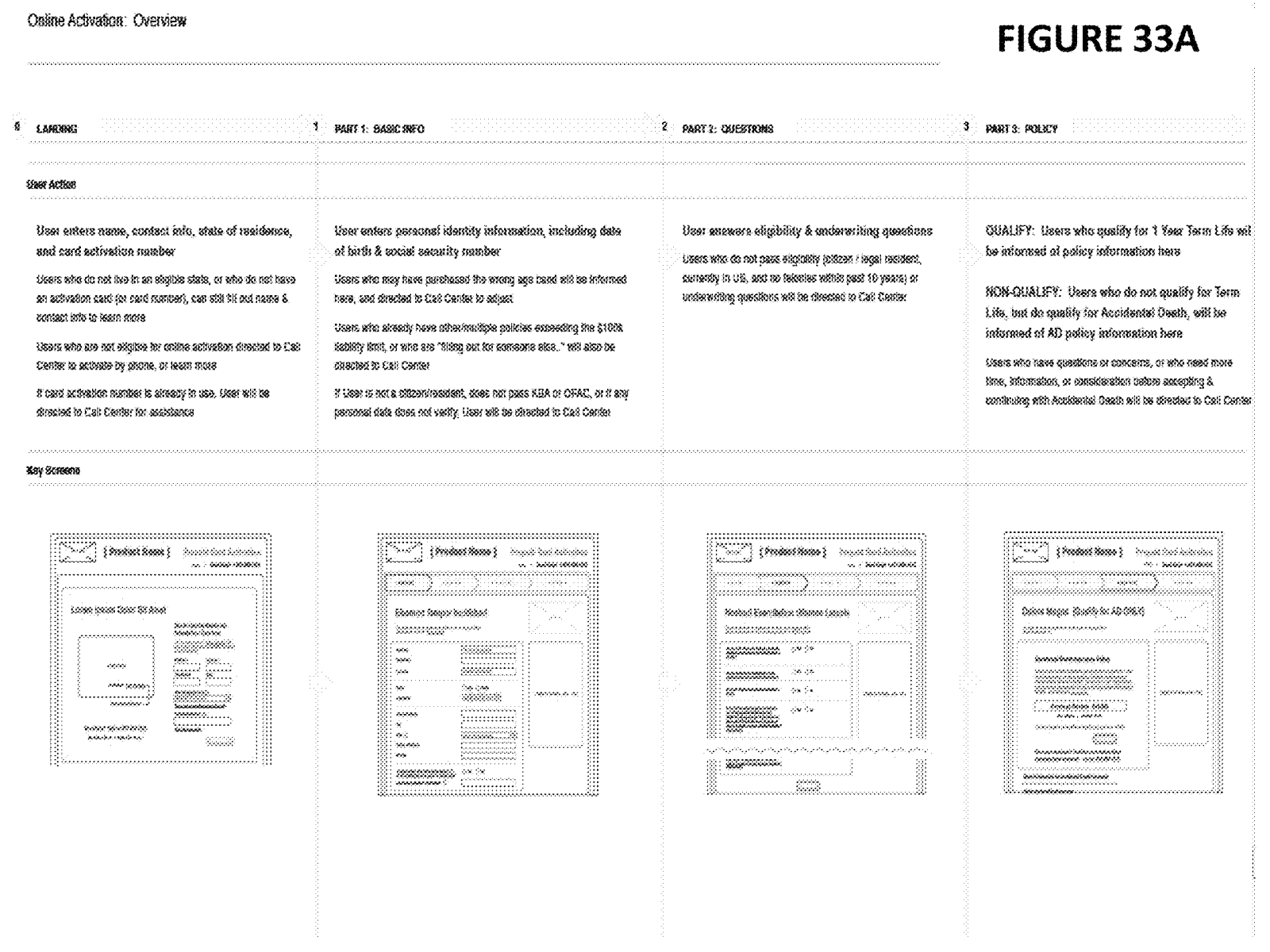
Figure 33B:
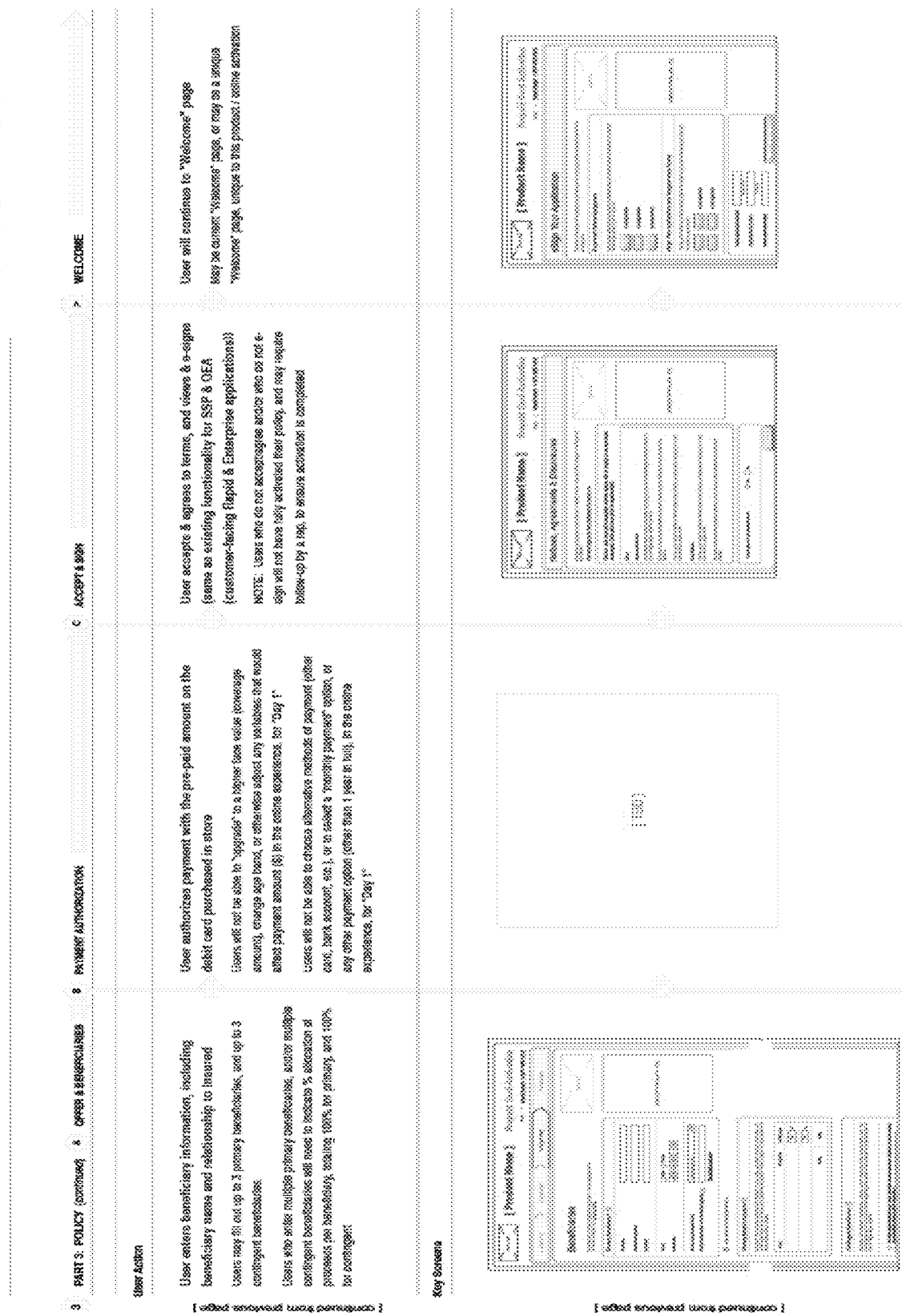

Turning now to FIGS. 33A-33B, an overview of the logic within the screen display architecture is provided for each of the significant passages within the system, including the Landing, Basic Info, Questions, and Policy. The specific text recitations under each section are herein incorporated by reference into this portion of the specification for association with each identified passage.

Figure 34A:
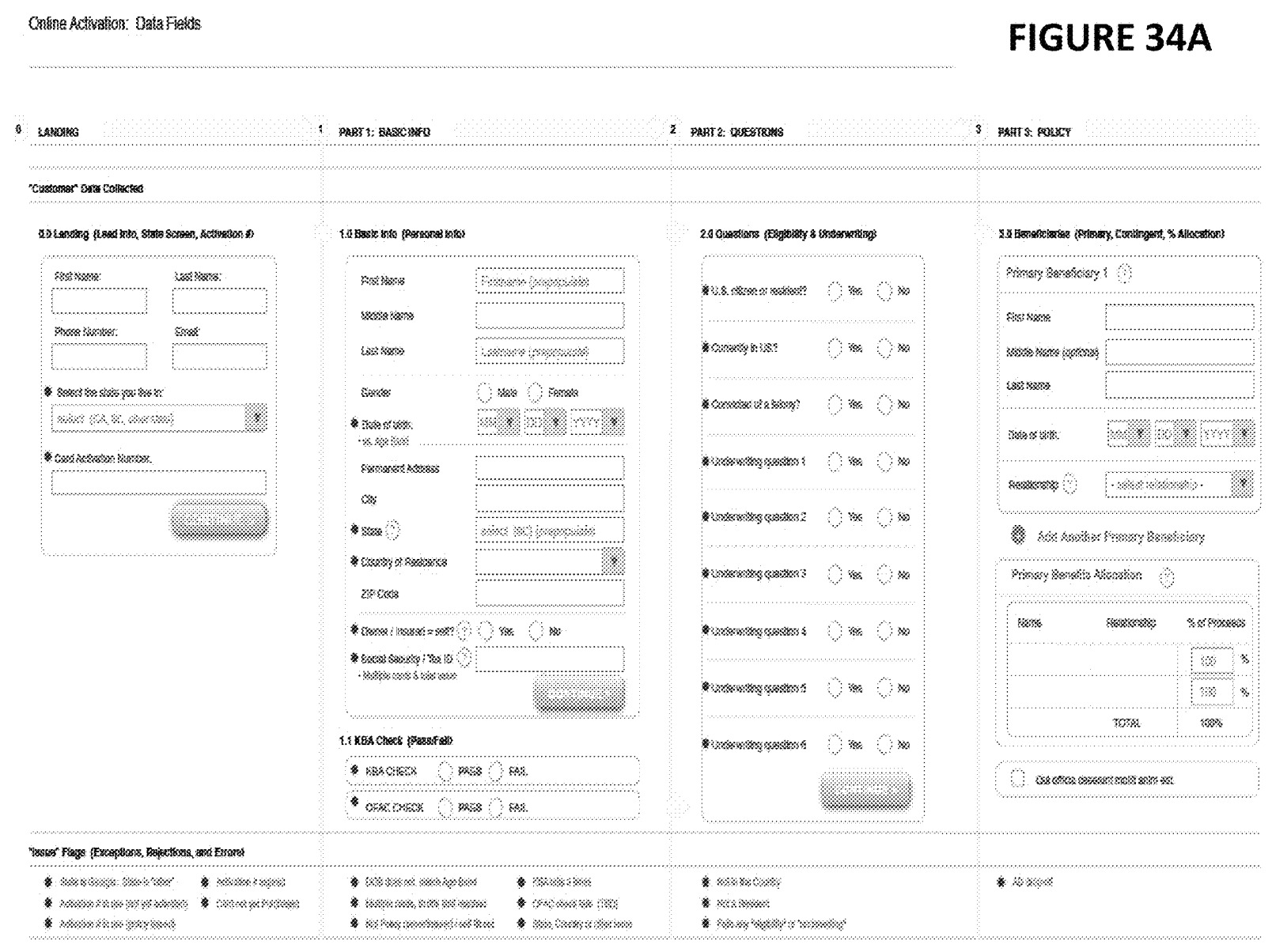
Figure 34B:
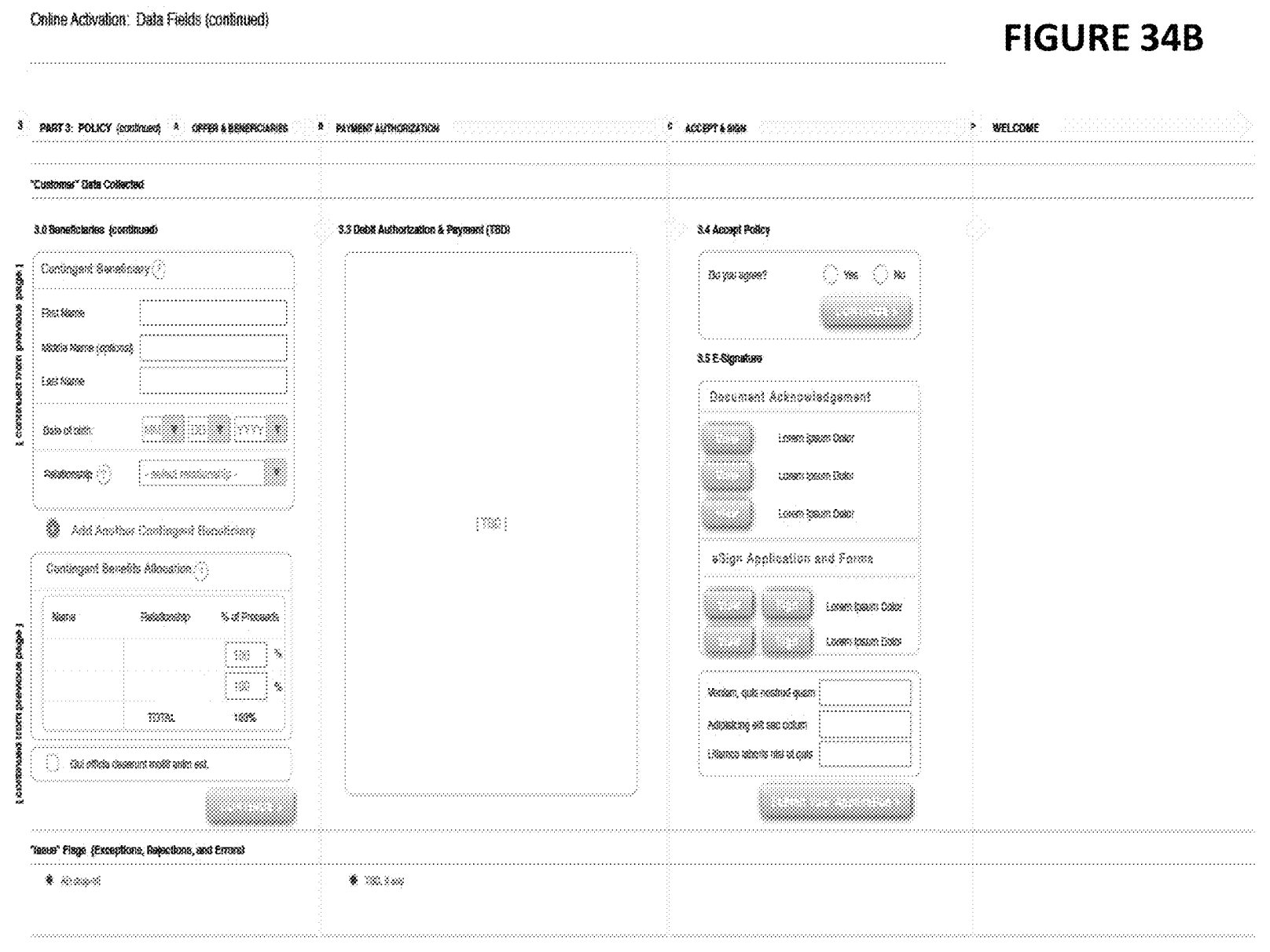
Figure 35:
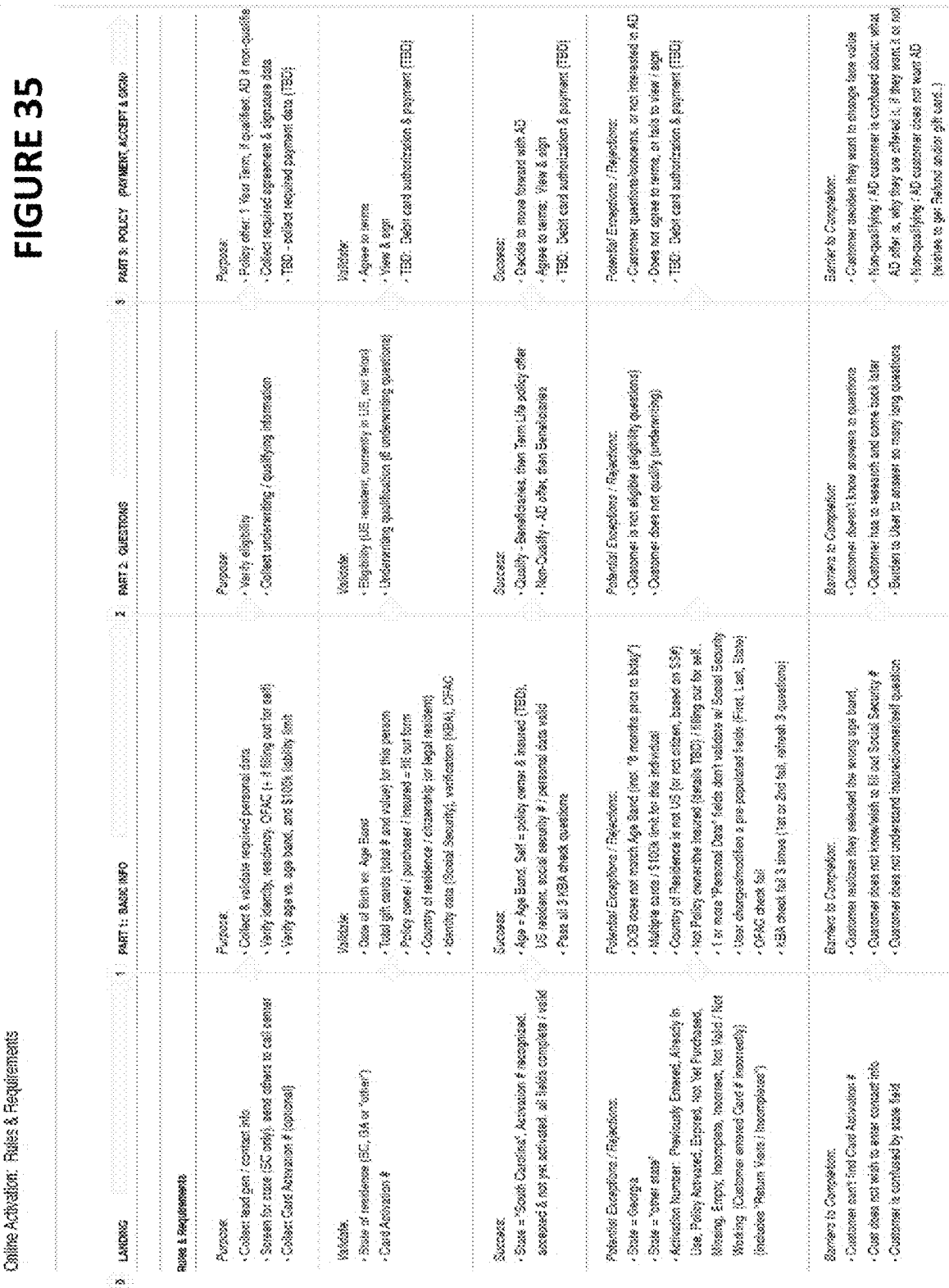
FIG. 35 summarizes the Rules and Requirements for the on-line operations.

The data field structure for this architecture is provided in FIGS. 34A-B and the Rules for application to the four passages are illustrated in FIG. 35.

For ease of exposition, not every step or element of the present invention is described herein as part of software or computer system, but those skilled in the art will recognize that each step or element may have a corresponding computer system or software component. Such computer systems and/or software components are therefore enabled by describing their corresponding steps or elements (that is, their functionality), and are within the scope of the present invention. In addition, various steps and/or elements of the present invention may be stored in a non-transitory storage medium, and selectively executed by a processor.

The foregoing components of the present invention described as making up the various elements of the invention are intended to be illustrative and not restrictive. Many suitable components that would perform the same or similar functions as the components described are intended to be embraced within the scope of the invention. Such other components can include, for example, components developed after the development of the present invention.

What is claimed:

1. A computer-implemented method for remotely activating a product using an activation code, comprising:

associating an activation code with a pre-paid card available for purchase in a retail environment, the activation code also associated with a plurality of products in an activation database, each product of the plurality of products having a different respective activation process;

querying an activation database using the activation code to identify a first subset of products that are associated with the activation code;

displaying, via a graphical user interface (GUI), a plurality of tabs, each tab corresponding to a step in an activation process associated with the first subset of products;

automatically advancing the activation process, via the GUI, by soliciting responses to a questionnaire displayed in a first tab, wherein questions displayed in the first tab correspond to eligibility requirements associated with the first subset of products, the eligibility requirements including a location of a remote client and demographic information of a user associated with the remote client;

receiving encoded data from the remote client;

decoding the encoded data to determine the location of the remote client and the demographic information of the user associated with the remote client;

automatically advancing the activation process, via the GUI, by soliciting upgrade opportunities associated with a second subset of products in a second tab, the second subset of products identified based on the responses to the questionnaire received at the first tab;

automatically advancing the activation process, via the GUI, by activating a selected product from the second subset of products, in a third tab; and insuring the user associated with the remote client in response to activating the selected product.

2. The method of claim 1, wherein the activation code comprises a unique code.

3. The method of claim 1, wherein the demographic information comprises a gender and date of birth of the user.

* * * * *